United States Patent
Uchida et al.

(10) Patent No.: US 9,490,665 B2
(45) Date of Patent: Nov. 8, 2016

(54) POWER TRANSMISSION DEVICE

(71) Applicant: FUJITSU LIMITED, Kawasaki-shi, Kanagawa (JP)

(72) Inventors: Akiyoshi Uchida, Akashi (JP); Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/083,465

(22) Filed: Mar. 29, 2016

(65) Prior Publication Data

US 2016/0211704 A1    Jul. 21, 2016

Related U.S. Application Data

(63) Continuation of application No. PCT/JP2013/076564, filed on Sep. 30, 2013.

(51) Int. Cl.
*H01F 38/14* (2006.01)
*H02J 7/02* (2016.01)

(52) U.S. Cl.
CPC ............ *H02J 50/12* (2016.02); *H01F 38/14* (2013.01); *H02J 7/025* (2013.01)

(58) Field of Classification Search
CPC .......... H02J 50/12; H02J 7/025; H01F 38/14
See application file for complete search history.

(56) References Cited

U.S. PATENT DOCUMENTS

| | | | |
|---|---|---|---|
| 2010/0237709 A1* | 9/2010 | Hall | B60L 11/182 307/104 |
| 2011/0046438 A1 | 2/2011 | Iwaisako | |
| 2012/0161530 A1 | 6/2012 | Urano | |
| 2013/0015720 A1 | 1/2013 | Shimokawa et al. | |
| 2014/0021798 A1* | 1/2014 | Kesler | H02J 17/00 307/104 |
| 2014/0028110 A1* | 1/2014 | Petersen | H02J 5/005 307/104 |
| 2014/0312702 A1 | 10/2014 | Uchida | |

FOREIGN PATENT DOCUMENTS

| | | |
|---|---|---|
| EP | 2328252 A2 | 6/2011 |
| EP | 2536002 A1 | 12/2012 |
| JP | 2008-283791 | 11/2008 |
| JP | 2009-273213 | 11/2009 |

(Continued)

OTHER PUBLICATIONS

International Search Report, mailed in connection with PCT/JP2013/076564 and mailed Dec. 17, 2013 (1 page).

(Continued)

*Primary Examiner* — Rexford Barnie
*Assistant Examiner* — Terrence Willoughby
(74) *Attorney, Agent, or Firm* — Fujitsu Patent Center

(57) ABSTRACT

A power transmission device that adjusts the resonance frequency of a plurality of power transmitters with high precision, is provided.
The power transmission device includes a first power transmitter and a second power transmitter that respectively adjust the capacitance such that a resonance frequency is attained, based on a variation degree of a phase difference with respect to a variation of the capacitance when the capacitance of a variable capacitance unit is varied, and the first control unit adjusts the resonance frequency of the first power transmitter in a state where the second power transmitter is off, and the second control unit adjusts the resonance frequency of the second power transmitter in a state where the first power transmitter is off.

7 Claims, 15 Drawing Sheets

(56) References Cited

FOREIGN PATENT DOCUMENTS

| | | |
|---|---|---|
| JP | 2011-199975 | 10/2011 |
| JP | 2012-143131 | 7/2012 |
| WO | 2013/105279 A1 | 7/2013 |
| WO | 2011099071 | 12/2013 |

OTHER PUBLICATIONS

EESR—The Extended European Search Report dated Sep. 14, 2016 issued with respect to the corresponding European Patent Application No. 13894808.8.

* cited by examiner

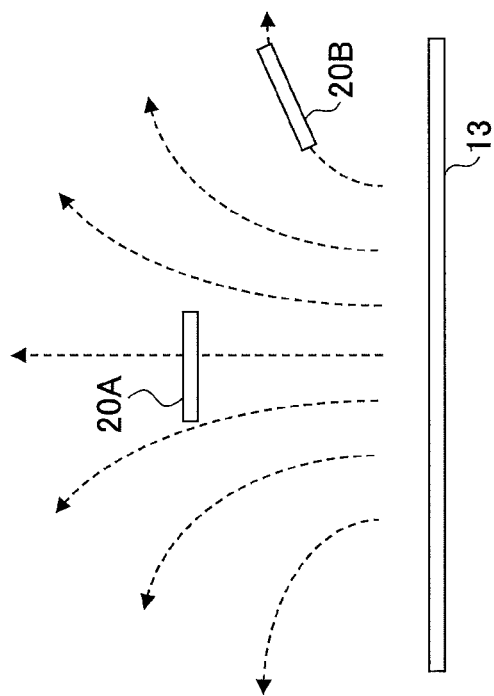
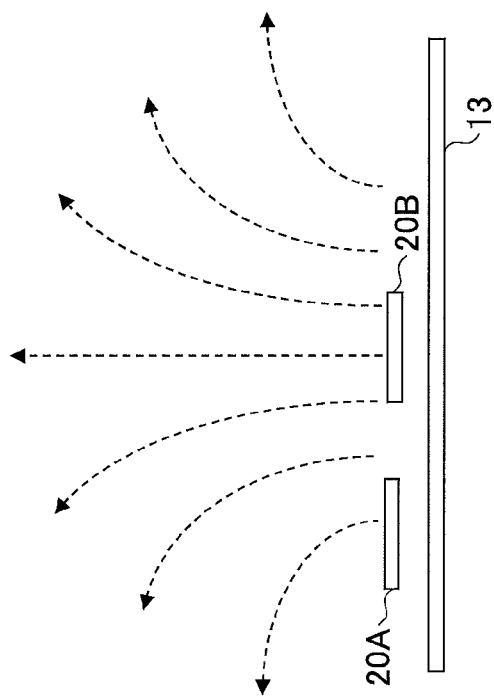

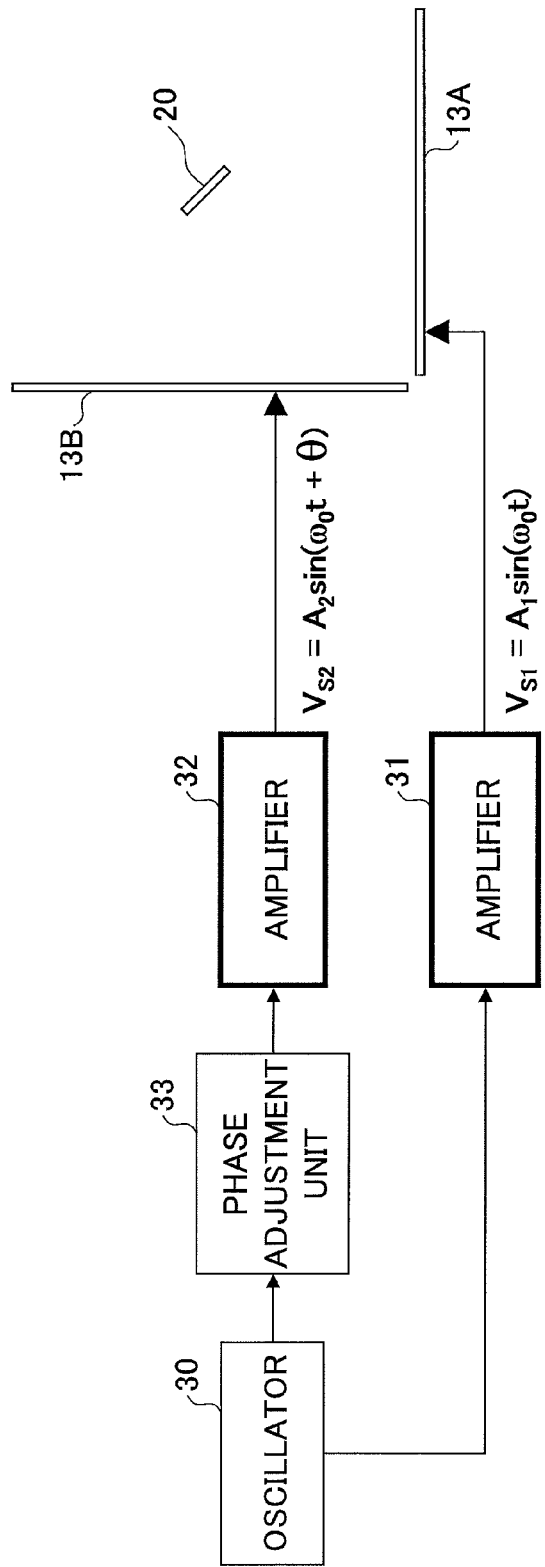

FIG.12

| EVENT | POWER TRANSMITTER 110A | | | POWER TRANSMITTER 110B | | | POWER TRANSMITTER 110C | | | SUM OF FLAGS |
|---|---|---|---|---|---|---|---|---|---|---|
| | PREVIOUS SETTING VALUE | PRESENT SETTING VALUE | FLAG | PREVIOUS SETTING VALUE | PRESENT SETTING VALUE | FLAG | PREVIOUS SETTING VALUE | PRESENT SETTING VALUE | FLAG | |
| POWER TRANSMITTER A RESONANCE ADJUSTMENT FIRST TIME | — | 25.5pF | | | | | | | | |
| POWER TRANSMITTER B RESONANCE ADJUSTMENT FIRST TIME | | | | — | 30.0pF | | | | | |
| POWER TRANSMITTER C RESONANCE ADJUSTMENT FIRST TIME | | | | | | | — | 41.2pF | | |
| CONFIRM ALL FLAGS FIRST TIME | 25.5pF | 27.0pF | | | | | | | | 0 |
| POWER TRANSMITTER A RESONANCE ADJUSTMENT SECOND TIME | | | | 30.0pF | 30.2pF | | | | | |
| POWER TRANSMITTER B RESONANCE ADJUSTMENT SECOND TIME | | | | | | | 41.2pF | 40.0pF | | |
| POWER TRANSMITTER C RESONANCE ADJUSTMENT SECOND TIME | 27.0pF | 26.8pF | | | | | | | | |
| CONFIRM ALL FLAGS SECOND TIME | | | 1 | | | | | | | 1 |
| POWER TRANSMITTER A RESONANCE ADJUSTMENT THIRD TIME | | | | 30.2pF | 30.2pF | 1 | | | | |
| POWER TRANSMITTER B RESONANCE ADJUSTMENT THIRD TIME | | | | | | | 40.0pF | 41.1pF | | |
| POWER TRANSMITTER C RESONANCE ADJUSTMENT THIRD TIME | 26.7pF | 26.8pF | 1 | | | | | | | |
| CONFIRM ALL FLAGS THIRD TIME | | | | | | | | | | 2 |
| POWER TRANSMITTER A RESONANCE ADJUSTMENT FOURTH TIME | | | | 30.2pF | 30.1pF | 1 | | | | |
| POWER TRANSMITTER B RESONANCE ADJUSTMENT FOURTH TIME | | | | | | | 41.1pF | 40.7pF | | |
| POWER TRANSMITTER C RESONANCE ADJUSTMENT FOURTH TIME | 26.8pF | 26.7pF | 1 | | | | | | | |
| CONFIRM ALL FLAGS FOURTH TIME | | | | | | | | | | 2 |
| POWER TRANSMITTER A RESONANCE ADJUSTMENT FIFTH TIME | | | | 30.1pF | 30.1pF | 1 | | | | |
| POWER TRANSMITTER B RESONANCE ADJUSTMENT FIFTH TIME | | | | | | | 40.7pF | 40.8pF | 1 | |
| POWER TRANSMITTER C RESONANCE ADJUSTMENT FIFTH TIME | | | | | | | | | | |
| CONFIRM ALL FLAGS FIFTH TIME | | | | | | | | | | 3 |

POWER TRANSMISSION DEVICE

CROSS-REFERENCE TO RELATED APPLICATION

This application is a U.S. continuation application filed under 35 USC 111(a) claiming benefit under 35 USC 120 and 365(c) of PCT Application PCT/JP2013/076564 filed on Sep. 30, 2013, the entire contents of which are incorporated herein by reference.

FIELD

The present invention is related to a power transmission device.

BACKGROUND

Conventionally, there is a wireless power feed system including a plurality of transmission antennas for transmitting power by a wireless method, a reception antenna for receiving the transmitted power, and a plurality of driving units for separately driving the plurality of transmission antennas. This wireless power feed system includes a detection unit for detecting information relevant to the arrangement state of the reception antenna, and a magnetic field data storage unit configured to store magnetic field data relevant to the magnetic field radiated from the transmission antenna, for each transmission antenna. This wireless power feed system includes a control unit configured to selectively drive and control the plurality of transmission antennas via the plurality of driving units, based on the magnetic field data and information relevant to the arrangement state of the reception antenna (see, for example, Patent Document 1).

Patent Document 1: Japanese Laid-Open Patent Publication No. 2008-283791

Incidentally, the conventional wireless power feed system selects a transmission antenna that feeds the highest level of power among the plurality of transmission antennas, and drives only the selected transmission antenna, and therefore the conventional wireless power feed system does not adjust the resonance frequency of the plurality of transmission antennas.

SUMMARY

A power transmission device according to an embodiment of the present invention includes a first power transmitter and a second power transmitter, wherein the first power transmitter includes a first primary side resonance coil configured to receive power from an AC power source, a first phase difference detection unit configured to detect a first phase difference between a phase of a first current flowing to the first primary side resonance coil and a phase of a first voltage supplied to the first primary side resonance coil, a first variable capacitance unit provided at the first primary side resonance coil, and a first control unit configured to adjust a first capacitance of the first variable capacitance unit such that a resonance frequency is attained, based on a variation degree of the first phase difference with respect to a variation of the first capacitance when the first capacitance is varied, and wherein the second power transmitter includes a phase adjustment unit connected to the AC power source, a second primary side resonance coil configured to receive power from the AC power source via the phase adjustment unit, the second primary side resonance coil being arranged beside the first primary side resonance coil, a second phase difference detection unit configured to detect a second phase difference between a phase of a second current flowing to the second primary side resonance coil and a phase of a second voltage supplied to the second primary side resonance coil, a second variable capacitance unit provided at the second primary side resonance coil, and a second control unit configured to adjust a second capacitance of the second variable capacitance unit such that a resonance frequency is attained, based on a variation degree of the second phase difference to a variation of the second capacitance when the second capacitance is varied, and wherein the first control unit adjusts the resonance frequency of the first power transmitter in a state where the second power transmitter is off, and the second control unit adjusts the resonance frequency of the second power transmitter in a state where the first power transmitter is off.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF DRAWINGS

FIGS. 2A and 2B illustrate the relationship between the primary side resonance coil 13 and the power receivers 20A, 20B;

FIG. 4 illustrates how power is transmitted from the two primary side resonance coils 13A, 13B to the power receiver 20;

FIG. 12 illustrates an example of data in a table format, indicating the capacitance of the capacitors 132A, 132B, 132C that are adjusted by the transmission side control circuits 14A, 14B, 14C of the power transmitters 110A, 110B, 110C, and the flag that is turned on when adjustment of the capacitance is completed;

DESCRIPTION OF EMBODIMENTS

Before describing the first and second embodiments to which the power transmission device of the present invention is applied, a description is given of the technical premise of the power transmission device according to the first and second embodiments, with reference to FIGS. 1 through 6.

Figure 1:
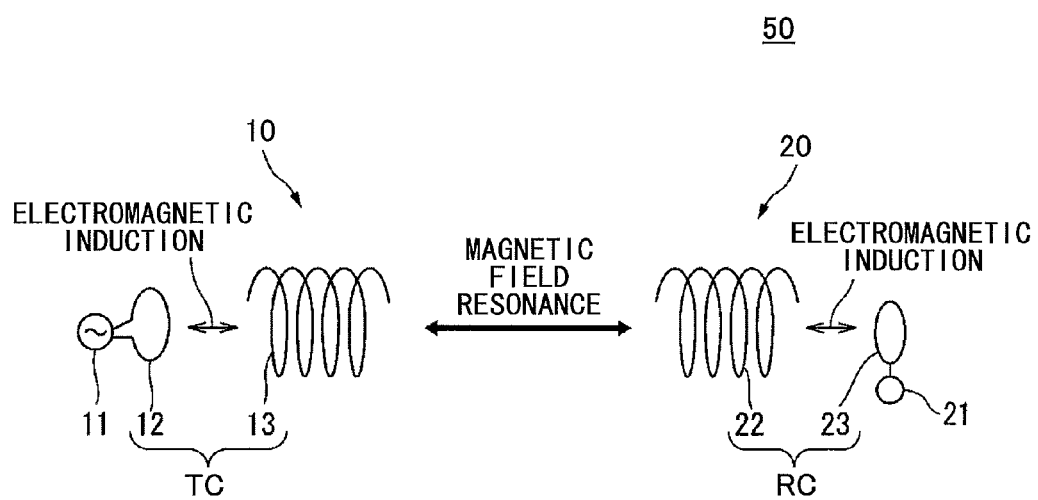
FIG. 1 illustrates a power transmission apparatus 50 including a power transmission device 1.

FIG. 1 illustrates a power transmission apparatus 50 including a power transmission device 1.

As illustrated in FIG. 1, the power transmission apparatus 50 includes a power transmitter 10 on the primary side (power transmission side) and a power receiver 20 on the secondary side (power receiving side). The power transmission apparatus 50 may include a plurality of power transmitters 10 and a plurality of power receivers 20. Note that in FIG. 1, the power transmission device according to the first embedment is omitted.

The power transmitter 10 includes an AC (alternating-current) power source 11, and a power transmission system coil TC including a primary side coil 12 and a primary side resonance coil 13. The power receiver 20 includes a power reception system coil RC including a secondary side resonance coil 22 and a secondary side coil 23, and a load device 21.

As illustrated in FIG. 1, energy (power) is transmitted from the power transmitter 10 to the power receiver 20, by magnetic field resonance between the primary side resonance coil (LC resonator) 13 and the reception side resonance coil (LC resonator) 22. Here, the power transmission from the primary side resonance coil 13 to the secondary side resonance coil 22 is possible not only by magnetic field resonance but also by electric field resonance, etc., however, in the following description, magnetic field resonance is mainly taken as an example.

Furthermore, in the first embodiment, a description is given of a case where the frequency of the alternating voltage output by the AC power source 11 is 6.78 MHz, and the resonance frequency of the primary side resonance coil 13 and the secondary side resonance coil 22 is 6.78 MHz.

Note that in the power transmission system coil TC, the power transmission from the primary side coil 12 to the primary side resonance coil 13 is performed by using electromagnetic induction. Furthermore, also in the power reception system coil RC, the power transmission from the secondary side resonance coil 22 to the secondary side coil 23 is performed by using electromagnetic induction.

FIGS. 2A and 2B illustrate the relationship between the primary side resonance coil 13 and the power receivers 20A, 20B. The power receivers 20A, 20B are the same as the power receiver 20 illustrated in FIG. 1. In FIGS. 2A and 2B, the directions of the magnetic field formed by a current output by the primary side resonance coil 13 are indicated by dashed-line arrows. The dashed-line arrows express magnetic field lines.

As illustrated in FIG. 2A, when the power receivers 20A, 20B are arranged to be perpendicular to the magnetic field lines with respect to the primary side resonance coil 13, both of the power receivers 20A, 20B are capable of receiving power.

As illustrated in FIG. 2B, when the power receiver 20A is arranged to be perpendicular to the magnetic field lines and the power receiver 20B is arranged to be parallel to the magnetic field lines with respect to the primary side resonance coil 13, the power receiver 20A is able to receive power but the power receiver 20B is not able to receive power.

Figure 3C:
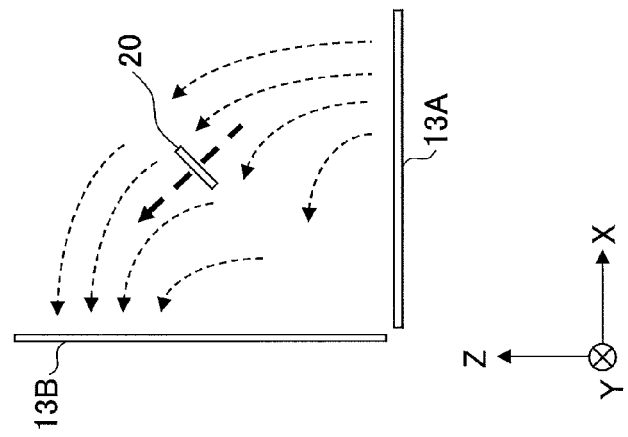
FIGS. 3A through 3C illustrate how power is transmitted from the two primary side resonance coils 13A, 13B to the power receiver 20.
Figure 3B:
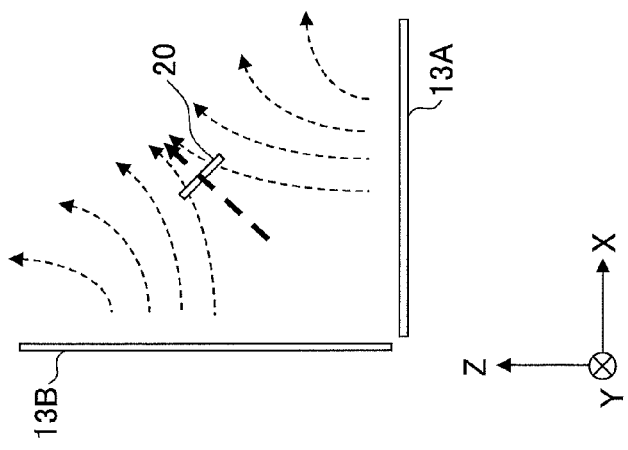
Figure 3A:
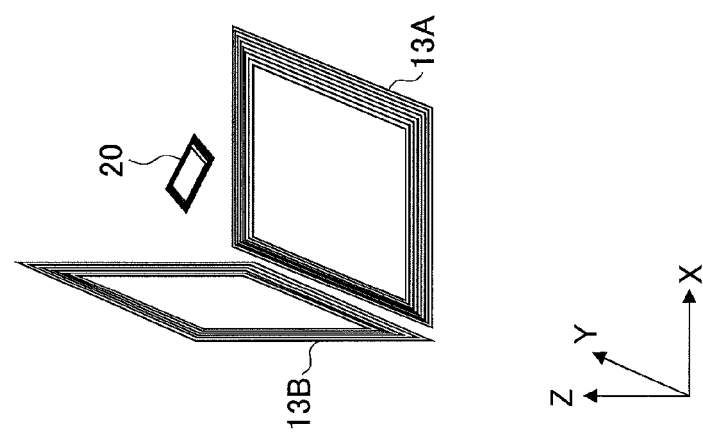

FIGS. 3A through 3C illustrate how power is transmitted from the two primary side resonance coils 13A, 13B to the power receiver 20. In FIGS. 3A through 3C also, the dashed-line arrows indicate magnetic field lines. Furthermore, an XYZ coordinate system is defined, which is an orthogonal coordinate system.

As illustrated in FIG. 3A, the two primary side resonance coils 13A, 13B are arranged to have a positional relationship of being perpendicular to each other. The primary side resonance coil 13A is parallel to the XY plane, and the primary side resonance coil 13B is parallel to the YZ plane. Power is transmitted in a wireless manner from the two primary side resonance coils 13A, 13B to the power receiver 20, by magnetic field resonance.

When the power receiver 20 is at the position illustrated in FIG. 3B, and power of the same phase (phase difference 0) is output from the primary side resonance coils 13A, 13B, the magnetic field lines output from both primary side resonance coils 13A, 13B penetrate the power receiver 20. Therefore, the power receiver 20 is able to receive power from the primary side resonance coils 13A, 13B.

Furthermore, when the power receiver 20 is at the position illustrated in FIG. 3C, and power having a phase difference of 180 degrees is output from the primary side resonance coils 13A, 13B, the magnetic field lines output from both primary side resonance coils 13A, 13B penetrate the power receiver 20. Therefore, the power receiver 20 is able to receive power from the primary side resonance coils 13A, 13B.

As described above, when power is transmitted from the primary side resonance coils 13A, 13B to the power receiver 20 by magnetic field resonance, the phase of power output from the primary side resonance coils 13A, 13B needs to be adjusted, according to the position of the power receiver 20 with respect to the primary side resonance coils 13A, 13B.

Note that, here, a description is given of a case where the two primary side resonance coils 13A, 13B are arranged to have a positional relationship of being perpendicular to each other. However, also in cases where the angle formed by the two primary side resonance coils 13A, 13B is other than 90 degrees, similarly, the phase of power output from the primary side resonance coils 13A, 13B needs to be adjusted. The same applies to the case where the angle formed by the two primary side resonance coils 13A, 13B is zero.

FIG. 4 illustrates how power is transmitted from the two primary side resonance coils 13A, 13B to the power receiver 20.

In FIG. 4, amplifiers 31, 32 are connected to an oscillator 30, and the amplifier 32 is connected to the oscillator 30 via a phase adjustment unit 33. The output terminals of the amplifiers 31, 32 are connected to the primary side resonance coils 13A, 13B, respectively.

In FIG. 4, the primary side resonance coils 13A, 13B are connected to the oscillator 30 without involving the primary side coil 12 (see FIG. 1).

The AC (alternating-current) power output from the oscillator 30 is amplified at the amplifier 31. The voltage of the AC power output from the amplifier 31 is expressed by $V_{s1} = A_1 \sin(\omega_0 t)$.

Furthermore, the AC power output from the oscillator 30 is amplified at the amplifier 32 after the phase is adjusted at the phase adjustment unit 33. The voltage of the AC power output from the amplifier 32 is expressed by $V_{s2}=A_2 \sin(\omega_0 t+\theta)$.

As described above, when outputting power from the two primary side resonance coils 13A, 13B, the phase of the power output from the primary side resonance coil 13B may be delayed by θ degrees with respect to the phase of the power output from the primary side resonance coil 13A.

When adjustment is made such that both of the primary side resonance coils 13A, 13B are in a state of being able to output power by a resonance frequency, and the power receiver is at a position as illustrated in FIG. 4 with respect to the primary side resonance coils 13A, 13B illustrated in FIG. 4, θ=0 degrees becomes the optimum phase. This is similar to the case illustrated in FIG. 3B.

Incidentally, in a case where power is input from the oscillator 30 to the primary side resonance coil 13A without involving the primary side coil 12 (see FIG. 1), the phase difference between the phase of the current flowing to the primary side resonance coil 13A, and the phase of the voltage output by the oscillator 30, is zero degrees. This point is the resonance point.

Accordingly, feedback control is implemented such that the phase difference between the phase of the current flowing to the primary side resonance coil 13A, and the phase of the voltage output by the oscillator 30, becomes zero degrees.

Similarly, in a case where power is input from the oscillator 30 to the primary side resonance coil 13B without involving the primary side coil 12 (see FIG. 1), the phase difference between the phase of the current flowing to the primary side resonance coil 13B, and the phase of the voltage output by the phase adjustment unit 33, is zero degrees. This point is the resonance point.

Accordingly, feedback control is implemented such that the phase difference between the phase of the current flowing to the primary side resonance coil 13B, and the phase of the voltage output by the phase adjustment unit 33, becomes zero degrees.

However, if the primary side resonance coils 13A, 13B are arranged in close contact, the coils will affect each other, and therefore the following consequences arise. The consequences are described with reference to FIGS. 5A and 5B.

Figure 5A:
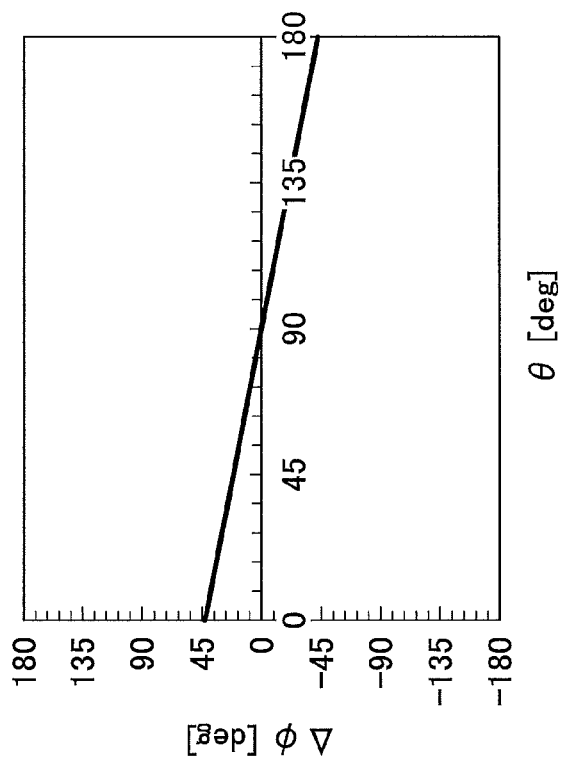
FIGS. 5A and 5B illustrate a relationship between the phase difference $\theta$ and the phase difference $\Delta\phi$ of the current and the voltage.
Figure 5B:
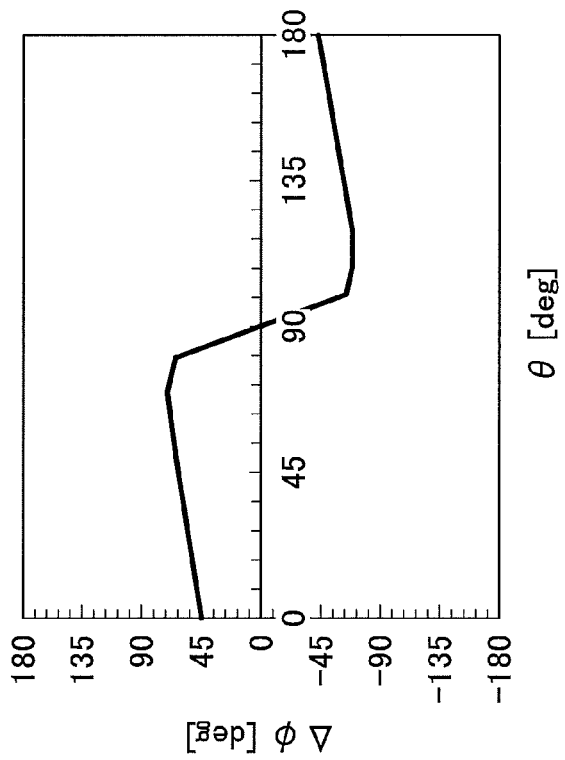

FIGS. 5A and 5B illustrate a relationship between the phase difference θ and the phase difference Δφ of the current and the voltage.

In FIGS. 5A and 5B, the horizontal axis is the phase difference θ. The phase difference θ is the phase difference between the phase of power output from the primary side resonance coil 13B, and the phase of power output from the primary side resonance coil 13A.

The vertical axis in FIG. 5A indicates the phase difference Δφ, between the phase of the current flowing to the primary side resonance coil 13A, and the phase of the voltage output by the oscillator 30, in a state where both of the primary side resonance coils 13A, 13B are turned on and outputting power.

The vertical axis in FIG. 5B indicates the phase difference Δφ, between the phase of the current flowing to the primary side resonance coil 13B, and the phase of the voltage output by the phase adjustment unit 33, in a state where both of the primary side resonance coils 13A, 13B are turned on and outputting power.

In FIGS. 5A and 5B, the levels of power output by the primary side resonance coils 13A, 13B are equal, and the power output by the primary side resonance coils 13A, 13B is adjusted to a resonance frequency by feedback control In FIG. 5A, at θ=90 degrees, the phase difference Δφ is zero degrees. This is because the primary side resonance coils 13A, 13B are physically arranged to form an angle of 90 degrees between each other, and therefore when the phase difference θ in the power output by the primary side resonance coils 13A, 13B is 90 degrees, the power levels cancel each other out, and the phase difference Δφ becomes zero.

FIG. 5B, at θ=90 degrees, the phase difference is zero degrees. This is because the primary side resonance coils 13A, 13B are physically arranged to form an angle of 90 degrees between each other, and therefore when the phase difference θ in the power output by the primary side resonance coils 13A, 13B is 90 degrees, the power levels cancel each other out, and the phase difference Δφ becomes zero.

Incidentally, when a characteristic as illustrated in FIG. 5A is attained, for example, when the power receiver 20 is arranged as illustrated in FIG. 4, a resonance point is supposed to be attained at θ=0 degrees; however, in FIG. 5A, the phase difference Δφ between the current and the voltage at θ=zero degrees, is approximately 45 degrees. Therefore, the feedback control unit of the primary side resonance coil 13A determines that the operation point is shifted from the resonance point, and implements further feedback control such that the phase difference Δφ between the current and the voltage becomes closer to zero degrees.

As a result, the operation point is further shifted away from the resonance point.

Furthermore, when a characteristic as illustrated in FIG. 5B is attained, for example, when the power receiver 20 is arranged as illustrated in FIG. 4, a resonance point is supposed to be attained at θ=0 degrees; however, in FIG. 5B, the phase difference Δφ between the current and the voltage at θ=zero degrees, is approximately 45 degrees. Therefore, the feedback control unit of the primary side resonance coil 13B determines that the operation point is shifted from the resonance point, and implements further feedback control such that the phase difference Δφ between the current and the voltage becomes closer to zero degrees.

As a result, the operation point is further shifted away from the resonance point.

As described above, in a system including two primary side resonance coils 13A, 13B, the coils affect each other, and therefore the resonance point is not successfully adjusted.

Figure 6:
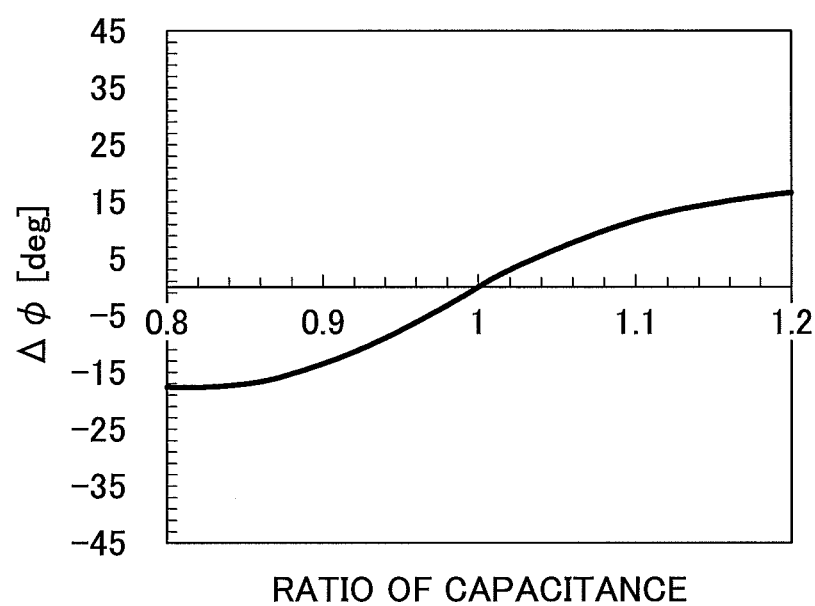
FIG. 6 illustrates the characteristic of the phase difference $\Delta\phi$ detected by the feedback control unit of the primary side resonance coil 13A, when the capacitance of a capacitor, which is inserted serially between both terminals of the primary side resonance coil 13B, is changed.

FIG. 6 illustrates the characteristic of the phase difference Δφ detected by the feedback control unit of the primary side resonance coil 13A, when the capacitance of a capacitor, which is inserted serially between both terminals of the primary side resonance coil 13B, is changed.

The horizontal axis in FIG. 6 expresses a ratio of a value of a capacitance, when the capacitance of the capacitor of the primary side resonance coil 13B is changed with respect to the capacitance of the capacitor of the primary side resonance coil 13B in a state where the capacitance of the capacitor is set such that both of the primary side resonance coils 13A, 13B are able to output power by a resonance frequency.

When the ratio of the horizontal axis is one, this expresses a state in which the capacitance of the capacitor of the primary side resonance coil 13B is adjusted to the capacitance of the capacitor of the primary side resonance coil 13B by which a resonance frequency is attained. This expresses that as the ratio of the horizontal axis shifts from one, the capacitance of the capacitor of the primary side resonance coil 13B is shifted from the capacitance of the capacitor of the primary side resonance coil 13B by which a resonance frequency is applied.

The vertical axis of FIG. 6 expresses a phase difference $\Delta\phi$ between the current and the voltage, detected by the feedback control unit of the primary side resonance coil 13A.

As illustrated in FIG. 6, when the capacitance of the capacitor of the primary side resonance coil 13B is changed, the phase difference between the current and the voltage, which is detected by the feedback control unit of the primary side resonance coil 13A, changes.

This expresses that in a system including two primary side resonance coils 13A, 13B, the coils affect each other.

Therefore, as the coils affect each other in a system including two primary side resonance coils 13A, 13B, if feedback control is implemented such that the phase difference between the current and the voltage becomes closer to zero degrees, the operation point gradually shifts away from the resonance point.

Furthermore, in a system including two primary side resonance coils 13A, 13B, it is significantly difficult to adjust the current flowing in both of the primary side resonance coils 13A, 13B to the resonance point at the same time.

Therefore, in the first and second embodiments described below, an objective is to provide a power transmission device that is capable of adjusting the resonance frequency with high precision, in the power transmission device including a plurality of primary side resonance coils.

First Embodiment

Figure 7:
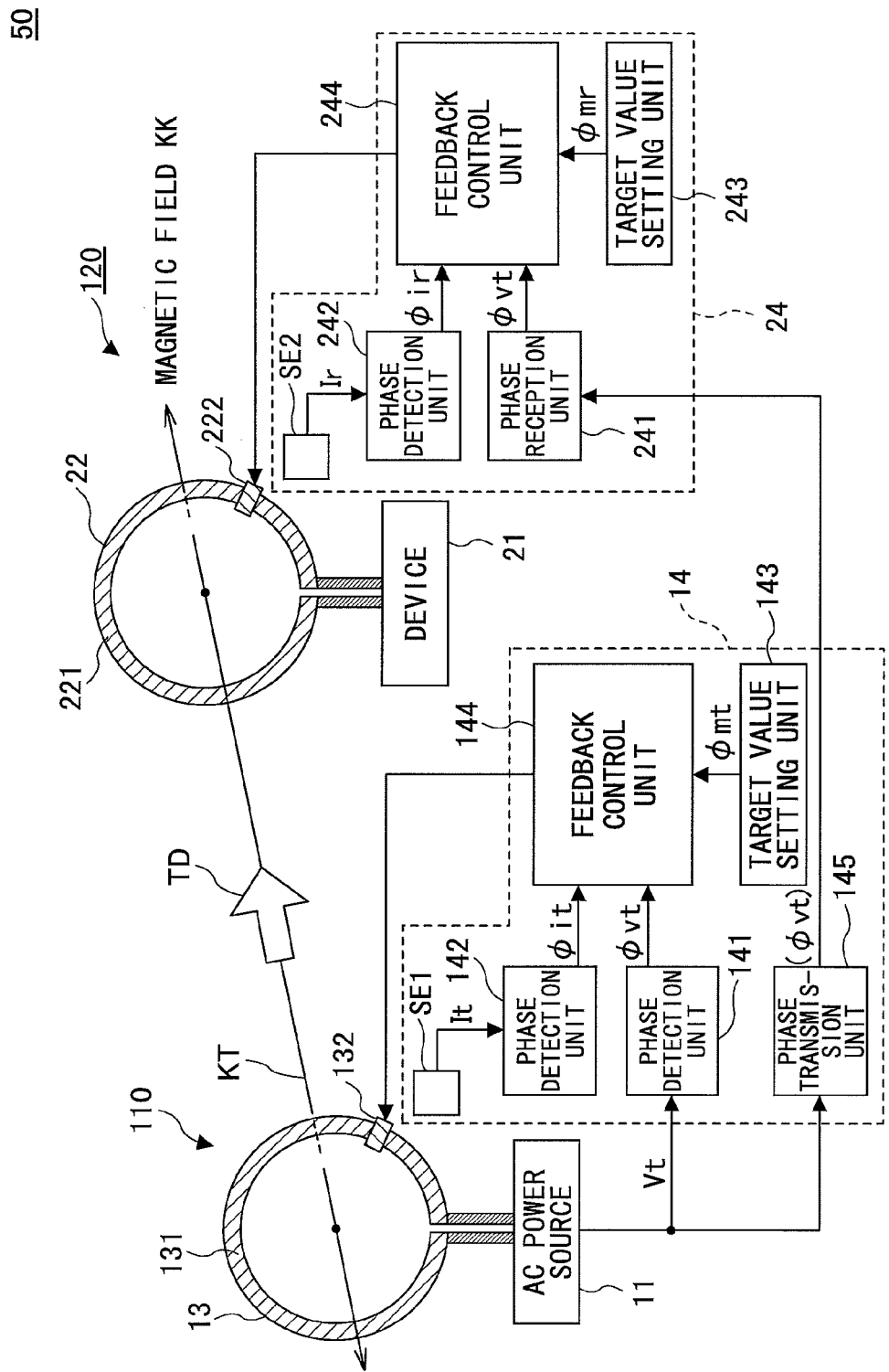
FIG. 7 illustrates the power transmission apparatus 50 including the power transmitter according to the first embodiment.
Figure 8:
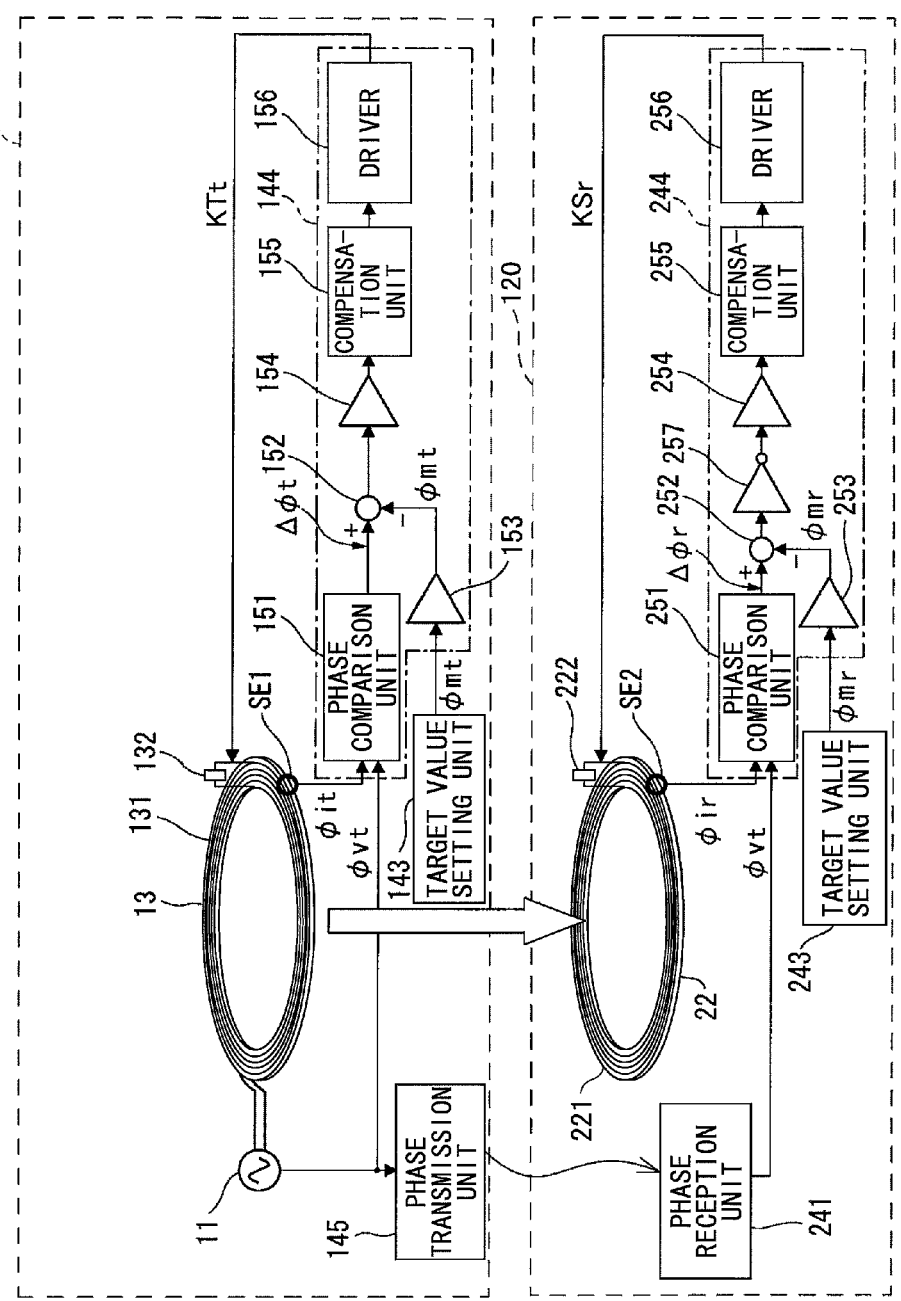
FIG. 8 is a block diagram of a control system of the power transmission apparatus 50 illustrated in FIG. 7.

In the first embodiment, a description is given of a power transmission device including three primary side resonance coils; however, here, first, with reference to FIGS. 7 and 8, a description is given of a power transmitter 110 including one primary side resonance coil 13 and the power transmission apparatus 50 including the power transmitter 110.

FIG. 7 illustrates the power transmission apparatus 50 including the power transmission device according to the first embodiment. FIG. 7 illustrates a detailed configuration of the power transmission apparatus 50 illustrated in FIG. 1. As illustrated in FIG. 7, the power transmission apparatus 50 includes a power transmitter 110 and a power receiver 120.

The power transmitter 110 includes a primary side resonance coil 13, an AC power source 11, and a transmission side control circuit 14. The power receiver 120 includes a secondary side resonance coil 22 and a reception side control circuit 24. To the power receiver 120, a load device 21 is connected.

The power transmitter 110 does not include the primary side coil 12 (see FIG. 1), and the AC power source 11 is directly connected to the primary side resonance coil 13.

The power receiver 120 does not include the secondary side coil 23 (see FIG. 1), and the load device 21 is directly connected to the secondary side resonance coil 22.

The primary side resonance coil 13 includes a coil 131 that is formed by winding around a metal line such as a copper line or an aluminum line in a circumferential manner, and a capacitor 132 that is connected to both ends of the coil 131, and forms a resonance circuit. Note that a resonance frequency f0 is indicated by the following formula (1).

$$f0 = 1/\{2\pi(LC)^{1/2}\} \quad (1)$$

Here, L is the inductance of the coil 131, and C is the capacitance of the capacitor 132.

The coil 131 of the primary side resonance coil 13 is, for example, a one-turn coil, and furthermore, various forms of capacitors may be applied as the capacitor 132; however, a capacitor having minimum loss and sufficient withstand voltage is preferable. The capacitor 132 is an example of a variable capacitative element.

In the power transmission apparatus illustrated in FIG. 7, in order to vary the resonance frequency, a variable capacitor is used as the capacitor 132. As the variable capacitor, for example, a variable capacitance device (varactor) using a variable capacitance device and a semiconductor manufactured by using the MEMS technology, may be applied.

The secondary side resonance coil 22 includes a coil 221 that is formed by winding around a metal line such as a copper line or an aluminum line in a circumferential manner, and a capacitor 222 that is connected to both ends of the coil 221. A resonance frequency f0 of the secondary side resonance coil 22 is indicated by formula (1) described above, according to the inductance of the coil 221 and the capacitance of the capacitor 222.

The coil 221 of the secondary side resonance coil 22 is, for example, a one-turn coil, and various forms of capacitors as described above may be applied as the capacitor 222. In the power transmission apparatus illustrated in FIG. 7, in order to vary the resonance frequency, a variable capacitor is used as the capacitor 222.

As the variable capacitor, similar to the capacitor 132, for example, a varactor using a variable capacitance device and a semiconductor manufactured by using the MEMS technology, may be applied.

On both ends of the secondary side resonance coil 22, the load device 21 is connected. Note that the load device 21 is, for example, a battery used as the power source of the power receiver 120 and a circuit for charging the battery.

Here, when transmitting power from the primary side resonance coil 13 to the secondary side resonance coil 22 in a wireless manner by magnetic field resonance, as illustrated in FIG. 7, the primary side resonance coil 13 and the secondary side resonance coil 22 are ideally arranged within an appropriate range of distance with respect to each other such that the coil planes are parallel to each other and the axial cores of the coils are matching each other or not much shifted from each other.

As illustrated in FIG. 7, in the power transmission apparatus 50, the direction KT along the axial core of the coil is the main radiation direction of the magnetic field KK, and the direction from the primary side resonance coil 13 to the secondary side resonance coil 22 is the power transmission direction TD.

Here, when the resonance frequency ft of the primary side resonance coil 13 and the resonance frequency fr of the secondary side resonance coil 22 both match the frequency fd of the AC power source 11, maximum power is transmitted.

In the power transmission apparatus 50 of FIG. 7, the transmission side control circuit 14 and the reception side control circuit 24 control the resonance frequencies ft and fr by using the phase $\phi vt$ of the AC power source 11 and the phases $\phi it$ and $\phi ir$ of the currents flowing to the primary side resonance coil 13 and the secondary side resonance coil 22, respectively. The resonance frequencies ft and fr are controlled to be equal to the frequency fd of the AC power source 11.

Here, the transmission side control circuit 14 detects the phase $\phi vt$ of the voltage Vt applied to the primary side resonance coil 13 and the phase $\phi it$ of the current It flowing to the primary side resonance coil 13, and variably controls the resonance frequency ft of the primary side resonance coil 13 such that the phase difference Δϕt becomes a predetermined target value ϕmt.

That is, the transmission side control circuit 14 includes a current detection sensor SE1, phase detection units 141, 142, a target value setting unit 143, a feedback control unit 144, and a phase transmission unit 145.

The current detection sensor SE1 detects the current It flowing to the primary side resonance coil 13. As the current detection sensor SE1, for example, a Hall element, a magnetic resistance element, or a detection coil may be used. This current detection sensor SE1 outputs, for example, a voltage signal according to the waveform of the current It.

The phase detection unit 141 detects the phase ϕvt of the voltage Vt applied to the primary side resonance coil 13, and outputs a voltage signal according to the waveform of the voltage Vt, for example. Here, the phase detection unit 141 may output the voltage Vt without modifying the voltage, or may divide the voltage by an appropriate resistance and then output the divided voltage. Therefore, the phase detection unit 141 may be a simple conductive wire, or may be one or more resistive elements.

The phase detection unit 142 detects the phase ϕit of the current It flowing to the primary side resonance coil 13, based on output from the current detection sensor SE1, and outputs a voltage signal according to the waveform of the current It, for example. Here, the phase detection unit 142 may directly output the output from the current detection sensor SE1. Therefore, the current detection sensor SE1 may also function as the phase detection unit 142.

The target value setting unit 143 sets and stores a target value ϕmt of the phase difference Δϕt. Therefore, the target value setting unit 143 is provided with a memory for storing the target value ϕmt. As the target value ϕmt, for example, zero degrees is set.

Note that the target value ϕmt may be set by selecting a value from one or more data items stored in advance, or may be set according to an instruction from a CPU or a keyboard.

The feedback control unit 144 variably controls the resonance frequency ft of the primary side resonance coil 13, such that the phase difference Δϕt between the phase ϕvt of the voltage Vt of the AC power source 11 and the phase ϕit of the current It of the primary side resonance coil 13 becomes the target value ϕmt that has been set.

The phase transmission unit 145 sends, in a wireless manner, information regarding the phase ϕvt of the voltage Vt supplied to the primary side resonance coil 13, as analog signals or digital signals, to the reception side control circuit 24. Here, for example, in order to increase the S/N ratio, the voltage signal according to the waveform of the voltage Vt may be multiplied by an integral multiple, and may be sent after the multiplication.

The reception side control circuit 24 detects the phase ϕvt of the voltage VT supplied to the primary side resonance coil 13 and the phase ϕir of the current IR flowing to the secondary side resonance coil 22, and variably controls the resonance frequency fr of the secondary side resonance coil 22 such that the phase difference Δϕr becomes a predetermined target value ϕmr.

That is, the reception side control circuit 24 includes a current detection sensor SE2, a phase reception unit 241, a phase detection unit 242, a target value setting unit 243, and a feedback control unit 244.

The current detection sensor SE2 detects the current Ir flowing to the secondary side resonance coil 22. As the current detection sensor SE2, for example, a Hall element, a magnetic resistance element, or a detection coil may be used. This current detection sensor SE2 outputs, for example, a voltage signal according to the waveform of the current It.

The phase reception unit 241 receives information regarding the phase ϕvt sent from the phase transmission unit 145, and outputs the received information. Here, when the voltage signal has been multiplied at the phase transmission unit 145, the phase reception unit 241 performs division on the signal to obtain the original value. For example, the phase reception unit 241 outputs a voltage signal according to the voltage Vt.

The phase detection unit 242 detects the phase ϕir of the current Ir flowing to the secondary side resonance coil 22, based on output from the current detection sensor SE2, and outputs a voltage signal according to the waveform of the current Ir. Here, the phase detection unit 242 may directly output the output from the current detection sensor SE2. Therefore, the current detection sensor SE2 may also function as the phase detection unit 242.

The target value setting unit 243 sets and stores a target value ϕmr of the phase difference Δϕr. Therefore, the target value setting unit 243 is provided with a memory for storing the target value war. As the target value ϕmr, for example, zero is set as the target value ϕmt in the transmission side control circuit 14.

Note that the method of setting the target value war, etc., is the same as the case for the target value ϕmt.

The feedback control unit 244 variably controls the resonance frequency fr of the secondary side resonance coil 22, such that the phase difference Δϕr between the phase ϕvt of the voltage Vt of the AC power source 11 and the phase ϕir of the current Ir of the secondary side resonance coil 22 becomes the target value ϕmr that has been set.

Note that the target value setting unit 143 and the feedback control unit 144 in the transmission side control circuit 14 are examples of a resonance frequency control unit. Similarly, the target value setting unit 243 and the feedback control unit 244 in the reception side control circuit 24 are examples of a resonance frequency control unit.

Furthermore, as described above, as illustrated in FIG. 7, the primary side resonance coil 13 and the secondary side resonance coil 22 are preferably arranged within an appropriate range of distance with respect to each other such that the coil planes are parallel to each other and the axial cores of the coils are matching each other or not much shifted from each other.

However, the primary side resonance coil 13 is arranged in the device that transmits the power, while the secondary side resonance coil 22 is arranged in the device that receives the power, and therefore the positional relationship between the primary side resonance coil 13 and the secondary side resonance coil 22 is not constantly fixed, and may change.

Furthermore, when power is transmitted by magnetic field resonance, it is possible to transmit the power a longer distance compared to transmitting power by electromagnetic induction. Even in a case where the transmitting side and the receive side are further away from each other, it is possible to transmit power by magnetic field resonance.

Therefore, when transmitting power by magnetic field resonance, there are cases where there is a certain distance between the transmitting side and the receiving side. Furthermore, depending on the purpose of the power transmission apparatus 50, the distance between the primary side resonance coil 13 and the secondary side resonance coil 22 may vary each time the power is transmitted from the transmitting side to the receiving side.

Furthermore, the degree of coupling of the primary side resonance coil 13 and the secondary side resonance coil 22 changes according to the distance between these coils, etc.

FIG. 8 is a block diagram of a control system of the power transmission apparatus 50 illustrated in FIG. 7. FIG. 8 illustrates the details of the feedback control unit 144 of the power transmitter 110 and the feedback control unit 244 of the power receiver 120.

Here, in the block diagram of FIG. 8, as a matter of simplification, the phase detection units 141, 142, 241, 242 in FIG. 7 are omitted. That is, in FIG. 8, the phase φit of the current It flowing from the current detection sensor SE1 to the primary side resonance coil 13 is directly output; however, for example, this phase φit may be output via the phase detection unit 142 provided in the feedback control unit 144.

As illustrated in FIG. 8, the feedback control unit 144 includes a phase comparison unit 151, an addition unit 152, gain adjustment units 153, 154, a compensation unit 155, and a driver 156.

The phase comparison unit 151 compares the phase φit of the current It detected by the current detection sensor SE1, with the phase (φvt of the voltage Vt of the AC power source 11, and outputs a signal expressing the phase difference Δφt between the phase φit and the phase φvt. The signal expressing the phase difference Δφt output from the phase comparison unit 151 is input to the addition unit 152. The phase comparison unit 151 is an example of a phase difference detection unit.

The addition unit 152 subtracts the target value φmt set in the target value setting unit 143, from the phase difference Δφt output from the phase comparison unit 151 (inverts and adds). Therefore, when the phase difference Δφt and the target value (pmt match, the output of the addition unit 152 becomes zero.

The output of the addition unit 152 is input to the gain adjustment unit 154, and is further input to the compensation unit 155. Here, the gain adjustment units 153, 154 respectively adjust the gain with respect to an input value or data, or convert the data, etc., such that the control is implemented correctly.

The compensation unit 155 defines, for example, the gain with respect to low-frequency components. That is, for example, the feedback control unit 144 may be seen as a servo system for implementing feedback control on the MEMS variable capacitance device that is the capacitor 132.

Therefore, in the compensation unit 155, an appropriate servo filter is used for stabilizing, increasing the speed, and increasing the precision of the servo system. Furthermore, in such a servo system, a filter circuit or a calculus circuit for performing a PID (Proportional Integral Derivative Controller) operation in such a servo system is used according to need.

The driver 156 outputs, for example, a control signal KTt to a MEMS variable capacitance device that is the capacitor 132, and variably controls the capacitance of the MEMS variable capacitance device.

Here, the MEMS variable capacitance device (MEMS variable capacitor) includes, for example, a bottom electrode and a top electrode provided on a glass substrate, and the capacitance is changed by using the changes in the gap formed by a deflection that is generated by the electrostatic attraction caused by a voltage applied between these electrodes.

Note that in the MEMS variable capacitance device (capacitor 132), an electrode for the capacitor and an electrode for driving may be separately provided. Furthermore, the relationship between the voltage applied to the electrode for driving and the variation amount in the capacitance is not linear, and therefore the driver 156 may perform calculation, table conversion, etc., according to need, for performing the conversion.

The feedback control unit 244 includes a phase comparison unit 251, an addition unit 252, a gain adjustment units 253, 254, a compensation unit 255, a driver 256, and a polarity inverting unit 257.

Note that operations of the units in the feedback control unit 244 are substantially the same as the operations of the units in the feedback control unit 144 described above, and therefore descriptions thereof are omitted.

Note that the transmission side control circuit 14 and the reception side control circuit 24 in FIG. 7, and the feedback control unit 144 and the feedback control unit 244 in FIG. 8 may be realized by software or hardware or a combination of software and hardware.

For example, it is possible to realize the above units by causing a CPU to execute an appropriate computer program, by using a computer including a CPU, a memory such as a ROM and a RAM, and other peripheral elements. In this case, an appropriate hardware circuit will be used in combination.

Figure 9:
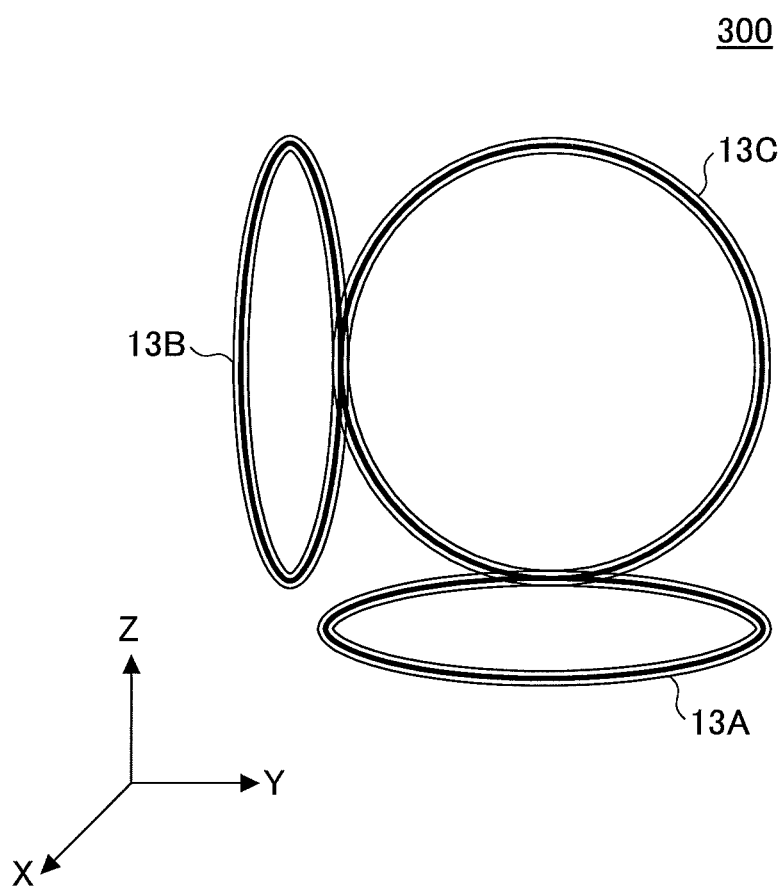
FIG. 9 illustrates primary side resonance coils 13A, 13B, 13C of a power transmission device 300 according to the first embodiment.

FIG. 9 illustrates primary side resonance coils 13A, 13B, 13C of a power transmission device 300 according to the first embodiment. In FIG. 9, an XYZ coordinate system is defined, which is an orthogonal coordinate system as illustrated. The primary side resonance coils 13A, 13B, 13C are the same as the primary side resonance coil 13 illustrated in FIGS. 7 and 8.

The primary side resonance coil 13A is arranged in parallel to the XY plane. The primary side resonance coil 13B is arranged in parallel to the XZ plane. The primary side resonance coil 13C is arranged in parallel to the YZ plane. The primary side resonance coils 13A, 13B, 13C are arranged to have a positional relationship of being perpendicular to each other, in a close-contact state.

The power transmission device 300 according to the first embodiment transmits power to the power receiver 20 by magnetic field resonance, by using the three primary side resonance coils 13A, 13B, 13C illustrated in FIG. 9.

Figure 10:
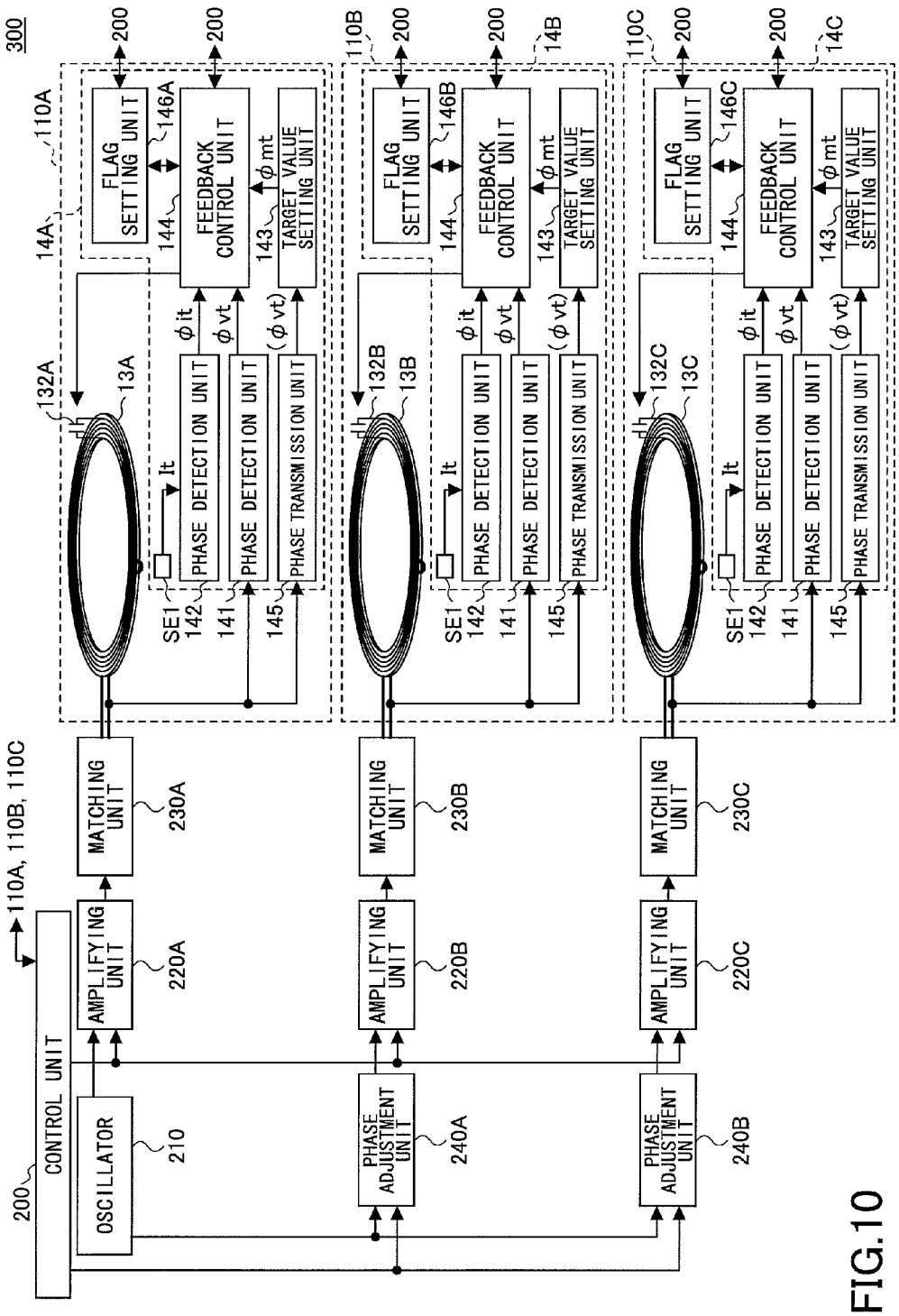
FIG. 10 illustrates the power transmission device 300 according to the first embodiment.

FIG. 10 illustrates the power transmission device 300 according to the first embodiment. The power transmission device 300 includes three power transmitters 110A, 110B, 110C, a control unit 200, an oscillator 210, amplifying units 220A, 220B, 220C, matching units 230A, 230B, 230C, and phase adjustment units 240A, 240B. Here, any one of the power transmitters 110A, 110B, 110C is an example of a first power transmitter, and any other of the power transmitters 110A, 110B, 110C is an example of a second power transmitter.

The power transmitters 110A, 110B, 110C respectively have configurations in which flag setting units 146A, 146B, 146C are added to the configuration of the power transmitter 110 illustrated in FIGS. 7 and 8. The power transmitters 110A, 110B, 110C respectively include the primary side resonance coils 13A, 13B, 13C and transmission side control circuits 14A, 14B, 14C.

The three primary side resonance coils 13A, 13B, 13C illustrated in FIG. 10 are actually assumed to be arranged as illustrated in FIG. 9. The power transmission device 300 transmits power, by magnetic field resonance, to the power receivers 120 (see FIGS. 7 and 8) that are positioned near the power transmitters 110A, 110B, 110C, from the three power transmitters 110A, 110B, 110C at the same time.

The primary side resonance coils 13A, 13B, 13C respectively include capacitors 132A, 132B, 132C. The capacitors 132A, 132B, 132C are the same as the capacitor 132 illustrated in FIGS. 7 and 8.

Any one of the primary side resonance coils 13A, 13B, 13C is an example of a first primary side resonance coil, and any other of the primary side resonance coils 13A, 13B, 13C is an example of a second primary side resonance coil. Any one of the capacitors 132A, 132B, 132C is an example of a first variable capacitance unit, and any other of the capacitors 132A, 132B, 132C is an example of a second variable capacitance unit.

The power transmitter 110A includes the primary side resonance coil 13A and the transmission side control circuit 14A. The power transmitter 110B includes the primary side resonance coil 13B and the transmission side control circuit 14B. The power transmitter 110C includes the primary side resonance coil 13C and the transmission side control circuit 14C.

The transmission side control circuits 14A, 14B, 14C have the same configuration, and respectively include a current detection sensor SE1, phase detection units 141, 142, a target value setting unit 143, a feedback control unit 144, and a phase transmission unit 145. Furthermore, the transmission side control circuits 14A, 14B, 14C respectively include the flag setting units 146A, 146B, 146C. The flag setting units 146A, 146B, 146C include an internal memory for holding a flag.

Any one of the transmission side control circuits 14A, 14B, 14C is an example of a first control unit, and any other of the transmission side control circuits 14A, 14B, 14C is an example of a second control unit. Note that the first control unit and the second control unit include part of the control unit 200.

The feedback control unit 144 of the transmission side control circuits 14A, 14B, 14C is switched between on/off by the control unit 200. The flag setting units 146A, 146B, 146C of the transmission side control circuits 14A, 14B, 14C respectively turn on ('1') a flag described below, when the setting of the capacitance of the capacitor 132A is completed. The flag setting units 146A, 146B, 146C send data indicating a value of the flag, to the control unit 200.

The control unit 200 switches the feedback control unit 144 of the transmission side control circuits 14A, 14B, 14C between on and off, and controls the amplifying units 220A, 220B, 220C and the phase adjustment units 240A, 240B.

Furthermore, the control unit 200 obtains the sum of the flags sent from the flag setting units 146A, 146B, 146C, and determines whether the process of adjusting the resonance frequency of the power transmitters 110A, 110B, 110C is completed.

In the power transmission device 300 according to the first embodiment, the adjustment of the resonance frequency of the power transmitters 110A, 110B, 110C is completed in advance, before transmitting power to the power receiver 120 by magnetic field resonance. The adjustment of the resonance frequency is done by having the feedback control unit 144 of the transmission side control circuits 14A, 14B, 14C set the capacitance of the capacitors 132A, 132B, 132C. Then, after the adjustment of the resonance frequency of the power transmitters 110A, 110B, 110C is completed, the capacitance is fixed at the capacitance obtained by the adjustment, and power is transmitted.

Note that at this time, the phases $\theta_1$, $\theta_2$ adjusted by the phase adjustment units 240A, 240B, are adjusted according to the position and the attitude of the power receiver 120 with respect to the primary side resonance coils 13A, 13B, 13C.

The oscillator 210, the amplifying units 220A, 220B, 220C, and the matching units 230A, 230B, 230C indicate a detailed configuration of the AC power source 11 illustrated in FIGS. 7 and 8.

The oscillator 210 outputs AC (alternating-current) power. The amplifying unit 220A amplifies the AC power output from the oscillator 210. The voltage of the AC power output by the amplifying unit 220A is expressed by $V_1 = A_1 \sin(\omega_0 t)$. $A_1$ is the amplitude of the voltage of the AC power after being amplified by the amplifying unit 220A and $\omega_0$ is the angular speed.

The amplifying units 220B, 220C amplify the AC power output from the oscillator 210 and the AC power of which the phase has been adjusted by the phase adjustment units 240A, 240B. Assuming that the phases adjusted by the phase adjustment units 240A, 240B are $\theta_1$, $\theta_2$, the voltages of the AC power output by the amplifying units 220B, 220C are respectively expressed by $V_2 = A \sin(\omega_0 t + \theta_1)$, $V_3 = A \sin(\omega_0 t + \theta_2)$. $A_2$, $A_3$ are the amplitudes of the voltages of the AC power after being amplified by the amplifying units 220B, 220C.

The amplification factor of the amplifying units 220A, 220B, 220C is controlled by the control unit 200.

The matching units 230A, 230B, 230C are circuits that respectively attain matching between the amplifying units 220A, 220B, 220C and the primary side resonance coils 13A, 13B, 13C.

The phase adjustment units 240A, 240B respectively add the phases $\theta_1$, $\theta_2$ to the AC power input from the oscillator 210, and output the AC power after the phases are added. The phases $\theta_1$, $\theta_2$ are controlled by the control unit 200.

The phases $\theta_1$, $\theta_2$ added to the AC power by the phase adjustment units 240A, 240B may be set by, for example, photographing the power receiver 120 with a camera, etc., detecting the attitude of the power receiver 120 by image processing, and setting the phases $\theta_1$, $\theta_2$ according to the detected attitude of the power receiver 120. This is similar to changing the phase as illustrated in FIGS. 3B, 3C. The setting of the phases $\theta_1$, $\theta_2$ as described above is to be done by detecting the attitude of the power receiver 120 by a known attitude detecting method. Furthermore, table data, in which the attitude of the power receiver 120 and the phases $\theta_1$, $\theta_2$ are associated, is prepared in advance, and stored in an internal memory, etc., of the control unit 200.

Figure 11:
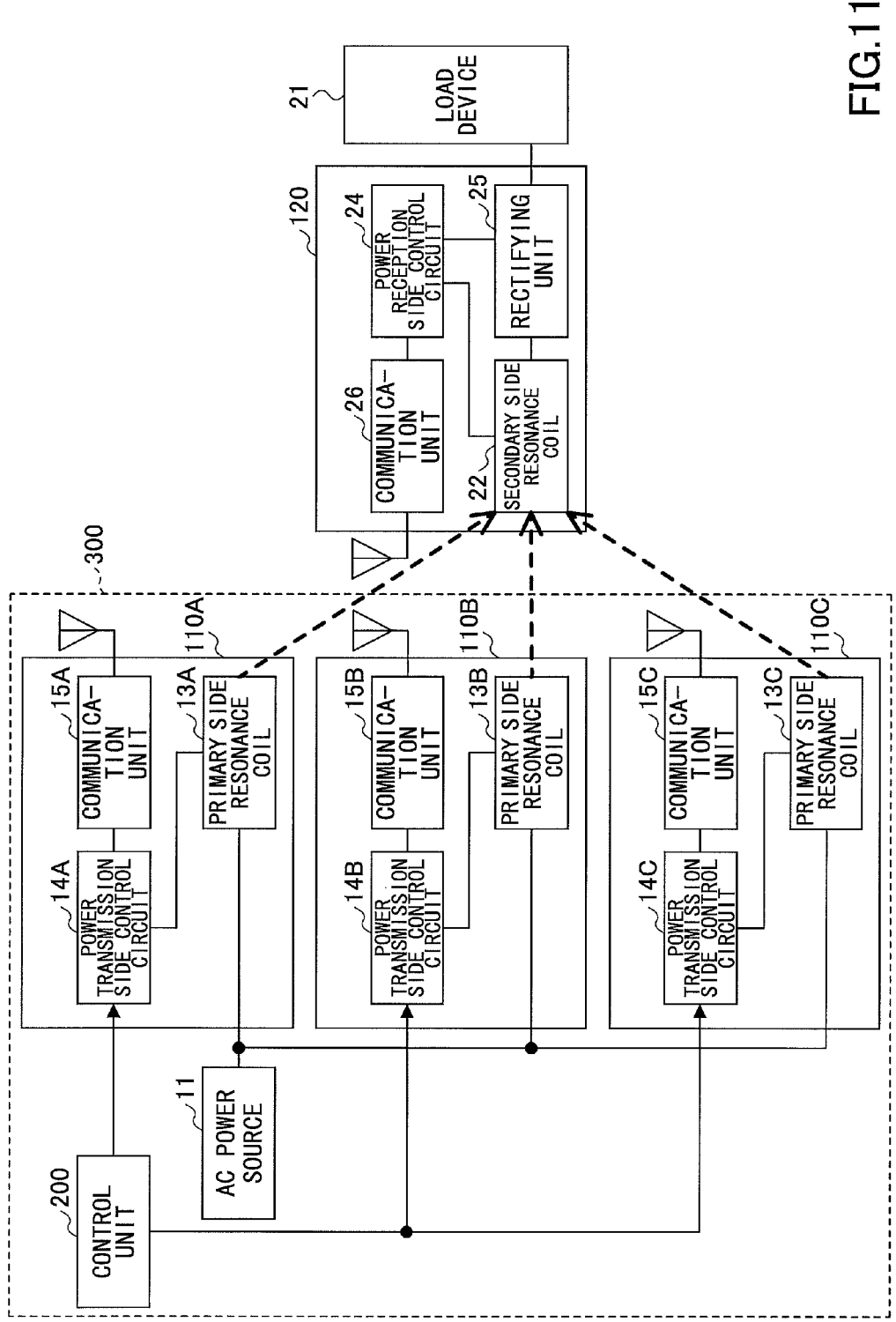
FIG. 11 illustrates the power transmission device 300 and the power receiver 120 according to the first embodiment.

FIG. 11 illustrates the power transmission device 300 and the power receiver 120 according to the first embodiment. The power transmission device 300 includes three power transmitters 110A, 110B, 110C, the control unit 200, and the AC power source 11. The AC power source 11 corresponds to the oscillator 210, the amplifying units 220A, 220B, 220C, and the matching units 230A, 230B, 230C illustrated in FIG. 10.

The transmitters 110A, 110B, 110C respectively include the primary side resonance coils 13A, 13B, 13C, the transmission side control circuits 14A, 14B, 14C, and communication units 15A, 15B, 15C.

The communication units 15A, 15B, 15C are connected to the transmission side control circuits 14A, 14B, 14C, and communicate with each other. The communication units 15A, 15B, 15C also communicate with a communication unit 26 of the power receiver 120. The communication between the communication units 15A, 15B, 15C and the communication unit 26 is, for example, the communication between the phase transmission unit 145 and the phase reception unit 241 illustrated in FIG. 7. As long as the communication units 15A, 15B, 15C are communication units that are capable of wireless communication, the format of wireless communication is not particularly limited, and any kind of format is applicable. AS the communication units 15A, 15B, 15C, for example, a communication circuit capable of performing Bluetooth (registered trademark) communication may be used.

The power receiver 120 includes the secondary side resonance coil 22, the reception side control circuit 24, a rectifying unit 25, and the communication unit 26. To the power receiver 120, the load device 21 is connected. The rectifying unit 25 rectifies the AC power received by the secondary side resonance coil 22, and supplies the AC power to the reception side control circuit 24 and the load device 21. The communication unit 26 performs communication with the communication units 15A, 15B, 15C of the power transmitters 110A, 110B, 110C.

The secondary side resonance coil 22 of the power receiver 120 receives the AC power from the primary side resonance coils 13A, 13B, 13C of the power transmitters 110A, 110B, 110C.

Figure 13:
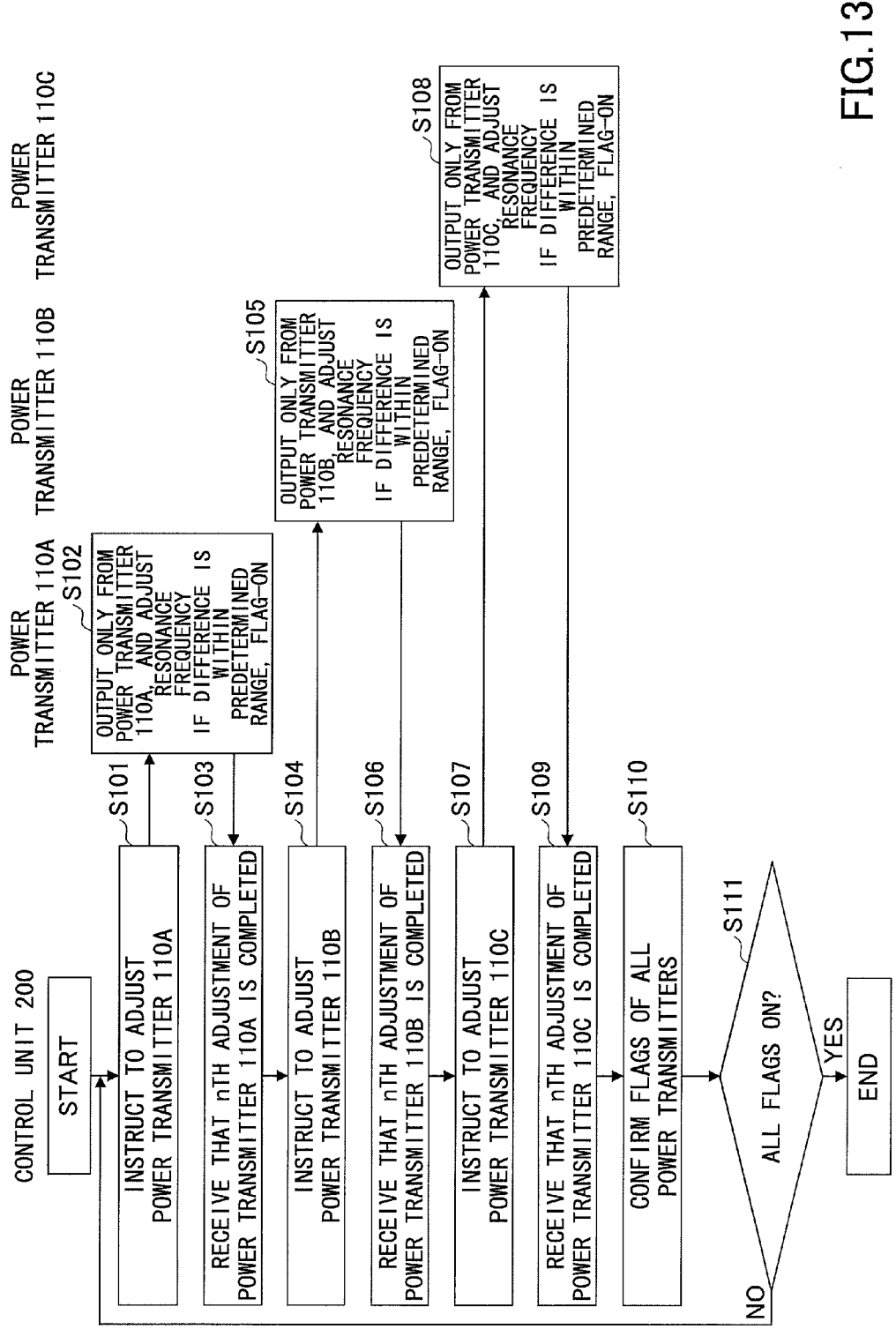
FIG. 13 is a flowchart indicating a process of setting the resonance frequency in the power transmission device 300 according to the first embodiment.

Next, with reference to FIGS. 12 and 13, a description is given of a method of adjusting the resonance frequency of the power transmitters 110A, 110B, 110C, in the power transmission device 300 according to the first embodiment. The adjustment of the resonance frequency of the power transmitters 110A, 110B, 110C is performed by the control unit 200 and the transmission side control circuits 14A, 14B, 14C.

FIG. 12 illustrates an example of data in a table format, indicating the capacitance of the capacitors 132A, 132B, 132C that is adjusted by the transmission side control circuits 14A, 14B, 14C of the power transmitters 110A, 110B, 110C, and the flag that is turned on when adjustment of the capacitance is completed. The flags of the power transmitters 110A, 110B, 110C are set by the flag setting units 146A, 146B, 146C.

In FIG. 12, an event expresses a content indicating that the control unit 200 causes the power transmitters 110A, 110B, 110C to adjust the capacitance. As the types of events, there are power transmitter A resonance adjustment first time, power transmitter B resonance adjustment first time, power transmitter C resonance adjustment first time, and confirm all flags first time, and the same events are set for the second to fifth times.

The power transmitter A resonance adjustment first time is an event in which the control unit 200 causes the transmission side control circuit 14A of the power transmitter 110A to set the capacitance of the capacitor 132A. More specifically, according to an instruction of the control unit 200, the feedback control unit 144 of the transmission side control circuit 14A sets the capacitance of the capacitor 132A. The method of setting the capacitance of the capacitor 132A is the same as that described with reference to FIGS. 7 and 8.

The power transmitter B resonance adjustment first time and the power transmitter C resonance adjustment first time are respectively events in which the control unit 200 causes the transmission side control circuits 14B, 14C of the power transmitters 110B, 110C to set the capacitance of the capacitors 132B, 132C. More specifically, according to an instruction of the control unit 200, the feedback control unit 144 of the transmission side control circuits 14B, 14C sets the capacitance of the capacitors 132B, 132C. The method of setting the capacitance of the capacitors 132B, 132C is the same as that described with reference to FIGS. 7 and 8.

Furthermore, the setting of the capacitance as described above is executed until the sum of flags described below becomes '3'.

FIG. 12 indicates, as one example, a case where the sum of flags becomes '3' by the fifth setting. Therefore, in FIG. 12, power transmitter A resonance adjustment first time, power transmitter B resonance adjustment first time, and power transmitter C resonance adjustment first time, to power transmitter A resonance adjustment fifth time, power transmitter B resonance adjustment fifth time, and power transmitter C resonance adjustment fifth time are indicated.

Furthermore, the flags indicated in FIG. 12 are set by the flag setting units 146A, 146B, 146C. The flag setting units 146A, 146B, 146C respectively turn on the flags when the variation of the present setting value with respect to the previous setting value is less than or equal to an absolute value of 0.2 pF. When the flag is turned on, the value of the flag becomes '1'.

Note that in the case of power transmitter A resonance adjustment first time, power transmitter B resonance adjustment first time, and power transmitter C resonance adjustment first time, there is no previous setting value, and therefore the flag is maintained to be off.

Confirm all flags first time is an event in which the control unit 200 calculates the total value of flags (sum of flags) obtained by power transmitter A resonance adjustment first time, power transmitter B resonance adjustment first time, and power transmitter C resonance adjustment first time, with respect to the power transmitters 110A, 110B, 110C. The sum of flags is the total value of flags set by the flag setting units 146A, 146B, 146C of the power transmitters 110A, 110B, 110C each time an adjustment is made.

Confirm all flags as described above is performed in the same manner in the second time to the fifth time. Note that at power transmitter A resonance adjustment first time, power transmitter B resonance adjustment first time, and power transmitter C resonance adjustment first time, the flag is maintained to be off, and therefore in the case of confirm all flags first time, the sum of flags is zero.

For example, in the case of power transmitter A resonance adjustment third time, the previous setting value is 27.0 pF and the present setting value is 26.8 pF, and therefore the flag is turned on ('1'). In the case of power transmitter B resonance adjustment third time, the previous setting value is 30.2 pF and the present setting value is also 30.2 pF, and therefore the flag is turned on ('1'). In the case of power transmitter C resonance adjustment third time, the previous setting value is 40.0 pF and the present setting value is 41.1 pF, and therefore the flag is maintained to be off.

Therefore, the sum of flags at confirm all flags third time is '2'.

In FIG. 12, as one example, the sum of flags becomes '3' at the setting of the fifth time, and therefore the process is completed by the setting of the fifth time.

Note that as described above, with respect to all of the power transmitters 110A, 110B, 110C, the adjustment of the resonance frequency is repeated until the variation of the present setting value with respect to the previous setting value becomes less than or equal to a predetermined value, for the following reasons. That is, the power transmission device 300 that uses magnetic field resonance has a significantly high Q value, and is therefore a sensitive system in which the peak of the Q value drastically changes even by a slight change in the capacitors 132A, 132B, 132C.

Next, with reference to FIG. 13, a description is given of a process of setting the resonance frequency in the power transmission device 300 according to the first embodiment.

FIG. 13 is a flowchart indicating a process of setting the resonance frequency in the power transmission device 300 according to the first embodiment. The process of setting the resonance frequency illustrated in FIG. 13 is executed by the control unit 200 and the power transmitters 110A, 110B, 110C, and is performed when the power transmission device 300 is installed in a predetermined location, for example.

As the power source of the power transmission device 300 is turned on, the control unit 200 starts the process.

The control unit 200 instructs the power transmitter 110A to adjust the resonance frequency (step S101). The adjustment of the resonance frequency of the power transmitter 110A is done in a state where only the power transmitter 110A is outputting AC power from the primary side resonance coil 13A, and the primary side resonance coils 13B, 13C of the power transmitters 110B, 110C are not outputting AC power.

The primary side resonance coils 13B, 13C of the power transmitters 110B, 110C are caused to be in a state of not outputting AC power, as the control unit 200 causes the feedback control unit 144 of the power transmitters 110B, 110C to stop the feedback control.

The power transmitter 110A outputs AC power from the primary side resonance coil 13A, executes the adjustment of the resonance frequency, and when the difference between the previous capacitance and the present capacitance is within a predetermined range, the power transmitter 110A turns on the flag (step S102).

Specifically, in a state where only the power transmitter 110A is outputting AC power from the primary side resonance coil 13A, the feedback control unit 144 of the transmission side control circuit 14A sets the capacitance of the capacitor 132A.

The method of setting the capacitance of the capacitor 132A is the same as that described with reference to FIGS. 7 and 8. Then, the flag setting unit 146A of the transmission side control circuit 14A turns the flag on, when the variation of the present setting value with respect to the previous setting value is less than or equal to an absolute value of 0.2 pF. The flag setting unit 146A sends data indicating that adjustment of the resonance frequency of the nth time has been completed and the data indicating the value of the flag, to the control unit 200. Here, the value of n expresses the number of times the process of setting a resonance frequency has been performed, and is incremented every time a process of setting a resonance frequency is performed.

Note that the feedback control unit 144 of the transmission side control circuit 14A fixes the capacitance of the capacitor 132A at the adjusted value of step S102.

The control unit 200 receives data indicating that adjustment of the resonance frequency of the nth time has been completed and the data indicating the value of the flag, from the power transmitter 110A (step S103).

The control unit 200 instructs the power transmitter 110B to adjust the resonance frequency (step S104). The adjustment of the resonance frequency of the power transmitter 110B is done in a state where only the power transmitter 110B is outputting AC power from the primary side resonance coil 13B, and the primary side resonance coils 13A, 13C of the power transmitters 110A, 110C are not outputting AC power.

The primary side resonance coils 13A, 13C of the power transmitters 110A, 110C are caused to be in a state of not outputting AC power, as the control unit 200 causes the feedback control unit 144 of the power transmitters 110A, 110C to stop the feedback control.

The transmission side control circuit 14B of the power transmitter 110B executes the adjustment of the resonance frequency, and when the difference between the previous capacitance and the present capacitance is within a predetermined range, the power transmitter 110B turns on the flag (step S105).

Specifically, in a state where only the power transmitter 110B is outputting AC power from the primary side resonance coil 13B, the feedback control unit 144 of the transmission side control circuit 14B sets the capacitance of the capacitor 132B. The method of setting the capacitance of the capacitor 132B is the same as that described with reference to FIGS. 7 and 8. Then, the flag setting unit 146B of the transmission side control circuit 14B turns the flag on, when the variation of the present setting value with respect to the previous setting value is less than or equal to an absolute value of 0.2 pF. The flag setting unit 146B sends data indicating that adjustment of the resonance frequency of the nth time has been completed and the data indicating the value of the flag, to the control unit 200.

Note that the feedback control unit 144 of the transmission side control circuit 14B fixes the capacitance of the capacitor 132B at the adjusted value of step S105.

The control unit 200 receives data indicating that adjustment of the resonance frequency of the nth time has been completed and the data indicating the value of the flag, from the power transmitter 110B (step S106).

The control unit 200 instructs the power transmitter 110C to adjust the resonance frequency (step S107). The adjustment of the resonance frequency of the power transmitter 110C is done in a state where only the power transmitter 110C is outputting AC power from the primary side resonance coil 13C, and the primary side resonance coils 13A, 13B of the power transmitters 110A, 110B are not outputting AC power.

The primary side resonance coils 13A, 13B of the power transmitters 110A, 110B are caused to be in a state of not outputting AC power, as the control unit 200 causes the feedback control unit 144 of the power transmitters 110A, 110B to stop the feedback control.

The transmission side control circuit 14C of the power transmitter 110C executes the adjustment of the resonance frequency, and when the difference between the previous capacitance and the present capacitance is within a predetermined range, the power transmitter 110C turns on the flag (step S108).

Specifically, in a state where only the power transmitter 110C is outputting AC power from the primary side resonance coil 13C, the feedback control unit 144 of the transmission side control circuit 14C sets the capacitance of the capacitor 132C. The method of setting the capacitance of the capacitor 132C is the same as that described with reference to FIGS. 7 and 8. Then, the flag setting unit 146C of the transmission side control circuit 14C turns the flag on, when the variation of the present setting value with respect to the previous setting value is less than or equal to an absolute value of 0.2 pF. The flag setting unit 146C sends data indicating that adjustment of the resonance frequency of the nth time has been completed and the data indicating the value of the flag, to the control unit 200.

Note that the feedback control unit 144 of the transmission side control circuit 14C fixes the capacitance of the capacitor 132C at the adjusted value of step S108.

The control unit 200 receives data indicating that adjustment of the resonance frequency of the nth time has been completed and the data indicating the value of the flag, from the power transmitter 110C (step S109).

The control unit 200 confirms flags of all of the power transmitters 110A, 110B, 110C (step S110).

Then, the control unit 200 determines whether all of the flags are on ('1') (step S111). Specifically, in step S111, the control unit 200 determines whether the sum of flags is '3'.

When the control unit 200 determines that all of the flags are on ('1'), the control unit 200 ends the series of processes.

Meanwhile, when the control unit 200 determines that all of the flags are not on ('1'), the flow returns to step S101. As a result, the process of setting the resonance frequency of the power transmitters 110A, 110B, 110C is performed again.

As described above, in the power transmission device 300 according to the first embodiment, the adjustment of the resonance frequency of the power transmitter 110A is performed in a state where only the power transmitter 110A is outputting AC power from the primary side resonance coil 13A, and the primary side resonance coils 13B, 13C of the power transmitters 110B, 110C are not outputting AC power. That is, the adjustment of the resonance frequency of the power transmitter 110A is performed in a state where only the power transmitter 110A is outputting AC power from the primary side resonance coil 13A.

Similarly, the resonance frequencies of the power transmitters 110B, 110C are respectively adjusted when only the power transmitters 110B, 110C are outputting AC power from the primary side resonance coils 13B, 13C.

Therefore, in the power transmission device 300 according to the first embodiment, it is possible to adjust the resonance frequency in a state where the effects of the power transmitters 110A, 110B, 110C on each other are reduced, and therefore it is possible to adjust the resonance frequencies of the power transmitters 110A, 110B, 110C with high precision.

As described above, the power transmission device 300 according to the first embodiment is capable of adjusting the resonance frequencies of a plurality of power transmitters with high precision. The resonance frequency of each of the power transmitters 110A, 110B, 110C is set in a state where the other two power transmitters are off.

Note that the above describes a mode where three power transmitters 110A, 110B, 110C are included, and the primary side resonance coils 13A, 13B, 13C of the three power transmitters 110A, 110B, 110C are arranged perpendicularly to each other.

However, the number of power transmitters and primary side resonance coils may be any number as long as there are two or more.

Furthermore, the plurality of primary side resonance coils may be arranged in any manner, as long as radio waves may be radiated in a larger area than an area in which radio waves are radiated by a single primary side resonance coil. The plurality of primary side resonance coils are to be arranged such that the areas in which they radiate power are in close contact, and the plurality of primary side resonance coils may be arranged in parallel without forming an angle. This is for having power receivers receive power in a wider range, by outputting power from a plurality of primary side resonance coils.

Furthermore, in the above description, the power transmitters 110A, 110B, 110C do not include a primary side coil 12, and directly receive supply of power from the AC power source 11. In this case, in the resonance frequency, the phase of the current flowing to the primary side resonance coils 13A, 13B, 13C is equal to the phase of the voltage output from the AC power source 11, and therefore the target value ϕmt of the target value setting unit 143 is set to zero degrees.

However, the power transmitters 110A, 110B, 110C may include a primary side coil 12. In this case, the primary side resonance coils 13A, 13B, 13C are to receive the power input from the AC power source 11 to the primary side coil 12, by electromagnetic induction from the primary side coil 12.

Note that in this case, in the resonance frequency, the phase of the current flowing to the primary side resonance coils 13A, 13B, 13C is delayed by 90 degrees with respect to the phase of the voltage output from the AC power source 11, and therefore the target value ϕmt of the target value setting unit 143 is to be set to 90 degrees.

Furthermore, the above describes a mode of adjusting the resonance frequency of the power transmitters 110A, 110B, 110C, when installing the power transmission device 300 at a predetermined location. However, for example, the control unit 200 may cause the feedback control unit 144 of the transmission side control circuits 14A, 14B, 14C to detect the phase of the current at every predetermined time interval, and when there is an abnormality in the detected phase, the resonance frequency of the power transmitters 110A, 110B, 110C may be adjusted.

Furthermore, the transmission side control circuits 14A, 14B, 14C may monitor the phase of the current, and when there is an abnormality in the phase, the transmission side control circuits 14A, 14B, 14C may adjust the resonance frequency of the power transmitters 110A, 110B, 110C in collaboration with the control unit 200.

Second Embodiment

Figure 14:
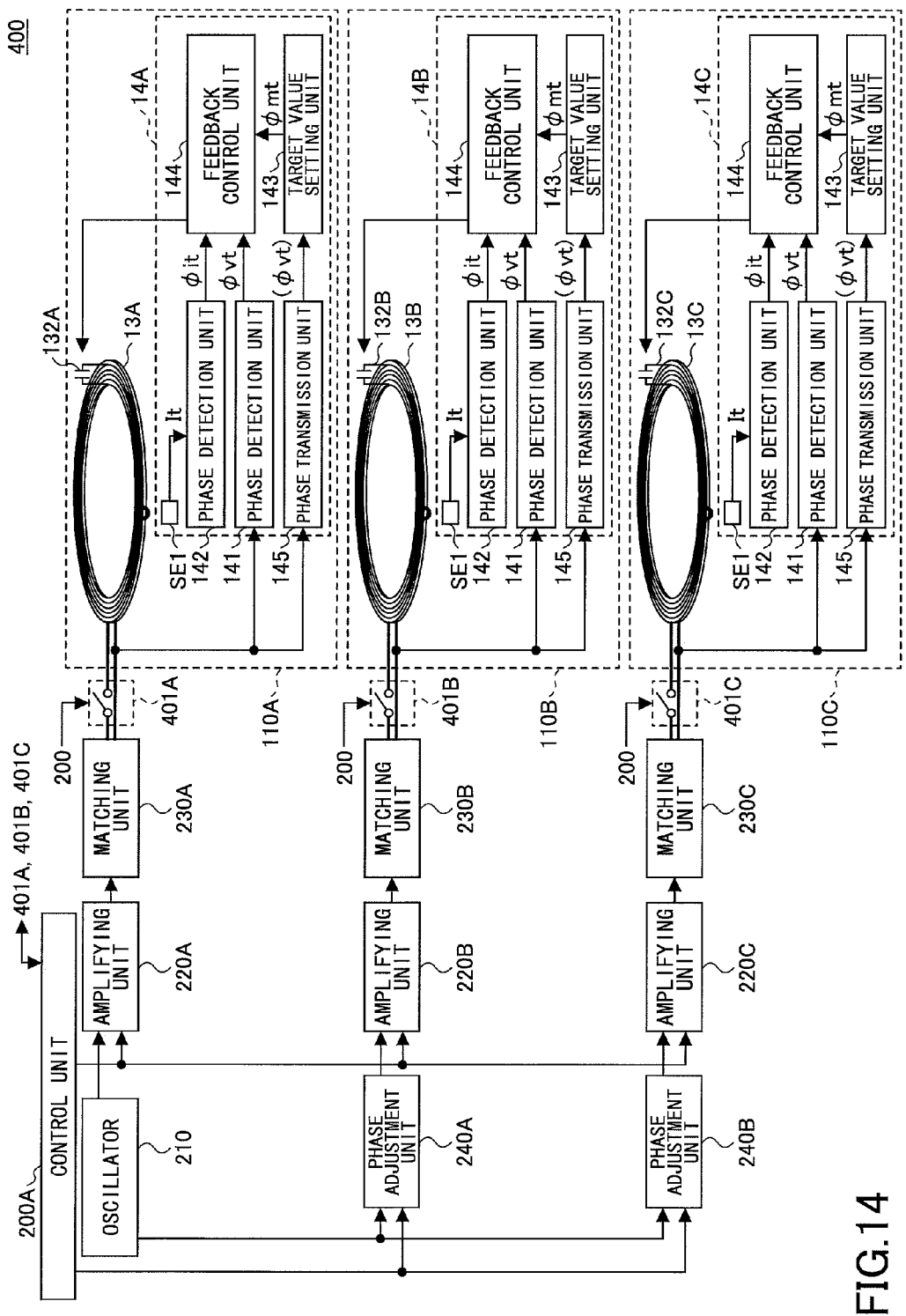
FIG. 14 illustrates a power transmission device 400 according to a second embodiment.

FIG. 14 illustrates a power transmission device 400 according to a second embodiment. The power transmission device 400 includes three power transmitters 110A, 110B, 110C, a control unit 200A, an oscillator 210, amplifying units 220A, 220B, 220C, matching units 230A, 230B, 230C, phase adjustment units 240A, 240B, and switches 401A, 401B, 401C.

The power transmission device 400 according to the second embodiment is different from the power transmission device 300 according to the first embodiment in the following points. The control unit 200 according to the first embodiment is replaced by the control unit 200A. The flag setting units 146A, 146B, 146C are respectively removed from the corresponding power transmitters 110A, 110B, 110C of the first embodiment. The switches 401A, 401B, 401C are added in between the matching units 230A, 230B, 230C and the primary side resonance coils 13A, 13B, 13C of the first embodiment.

Therefore, the same elements as those of the power transmission device 300 according to the first embodiment are denoted by the same reference numerals, and descriptions thereof are omitted.

As the transmission side control circuits 14A, 14B, 14C of the power transmitters 110A, 110B, 110C do not include the flag setting units 146A, 146B, 146C, the control process by the control unit 200A according to the second embodiment is different from the control process by the control unit 200 according to the first embodiment in the following points.

The control unit 200A does not switch the feedback control unit 144 of the transmission side control circuits 14A, 14B, 14C between on and off, and does not perform the process of obtaining the sum of flags.

Furthermore, the control unit 200A performs a process of switching the switches 401A, 401B, 401C, which is a different point from the control unit 200 according to the first embodiment.

The switches 401A, 401B, 401C are respectively inserted between the matching units 230A, 230B, 230C and the primary side resonance coils 13A, 13B, 13C. The switches 401A, 401B, 401C are switched between on and off by the control unit 200.

When the switches 401A, 401B, 401C are on, the switches 401A, 401B, 401C are respectively conductively connected to the matching units 230A, 230B, 230C and the primary side resonance coils 13A, 13B, 13C. When the switches 401A, 401B, 401C are off, the switches 401A, 401B, 401C are not conductively connected to the matching units 230A, 230B, 230C or the primary side resonance coils 13A, 13B, 13C.

The switches 401A, 401B, 401C are turned on when adjusting the resonance frequency of the power transmitters 110A, 110B, 110C, respectively. That is, when adjusting the resonance frequency of the power transmitter 110A, only the switch 401A is turned on. When adjusting the resonance frequency of the power transmitter 110B, only the switch 401B is turned on. When adjusting the resonance frequency of the power transmitter 110C, only the switch 401C is turned on.

This is to cut off the loop formed between the oscillator 210 and the other two power transmitters, when adjusting the resonance frequency of each of the power transmitters 110A, 110B, 110C.

Note that any one of the switches 401A, 401B, 401C is an example of a first switch, and any other of the switches 401A, 401B, 401C is an example of a second switch.

Figure 15:
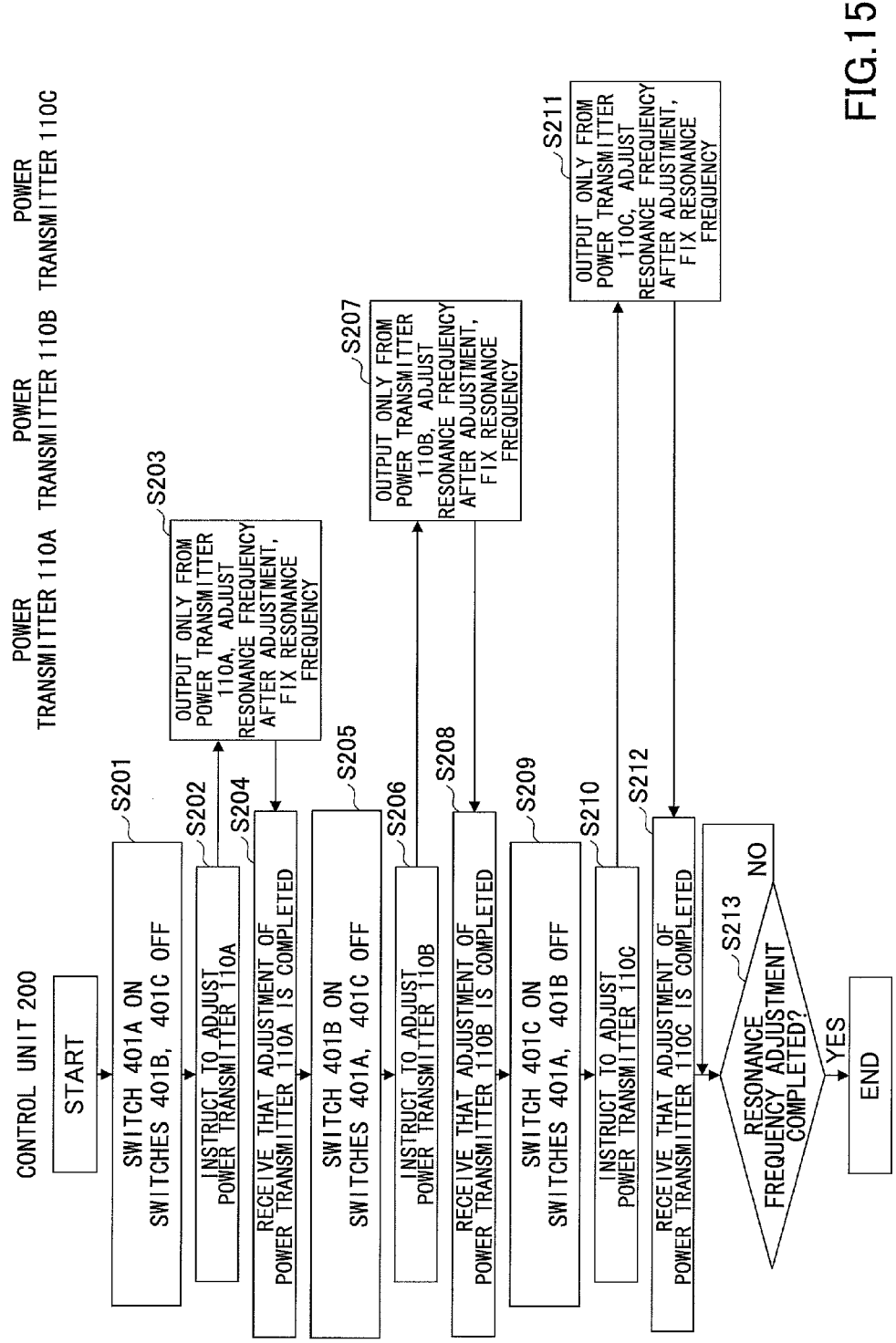
FIG. 15 is a flowchart of a process of setting the resonance frequency in the power transmission device 400 according to the second embodiment.

Next, with reference to FIG. 15, a description is given of a process of setting the resonance frequency in the power transmission device 400 according to the second embodiment.

FIG. 15 is a flowchart of a process of setting the resonance frequency in the power transmission device 400 according to the second embodiment. The process of setting the resonance frequency illustrated in FIG. 15 is executed by the control unit 200A and the power transmitters 110A, 110B, 110C, and is performed when the power transmission device 400 is installed in a predetermined location, for example.

As the power source of the power transmission device 400 is turned on, the control unit 200A starts the process.

The control unit 200A turns on the switch 401A and turns off the switches 401B, 401C, in order to adjust the resonance frequency of the power transmitter 110A (step S201).

The control unit 200A instructs the power transmitter 110A to adjust the resonance frequency (step S201). The adjustment of the resonance frequency of the power transmitter 110A is done in a state where only the power transmitter 110A is outputting AC power from the primary side resonance coil 13A, and the primary side resonance coils 13B, 13C of the power transmitters 110B, 110C are not outputting AC power. Furthermore, as the switches 401B, 401C are turned off, the loop connecting the oscillator 210 and the other power transmitters 110B, 110C is cut off by the switches 401B, 401C.

The power transmitter 110A outputs AC power from the primary side resonance coil 13A, and the feedback control unit 144 of the transmission side control circuit 14A executes the adjustment of the resonance frequency, and fixes the capacitance of the capacitor 132A to the adjusted value (step S203).

Specifically, in a state where the loop connecting the oscillator 210 and the other power transmitters 110B, 110C is cut off by the switches 401B, 401C, and only the power transmitter 110A is outputting AC power from the primary side resonance coil 13A, the feedback control unit 144 of the transmission side control circuit 14A sets the capacitance of the capacitor 132A. Then, the feedback control unit 144 fixes the capacitance of the capacitor 132A to the adjusted value.

The control unit 200A receives data indicating that that adjustment of the resonance frequency of the nth time has been completed from the power transmitter 110A (step S204).

The control unit 200A turns on the switch 401B and turns off the switches 401A, 401C, in order to adjust the resonance frequency of the power transmitter 110B (step S205).

The control unit 200A instructs the power transmitter 110B to adjust the resonance frequency (step S206). The adjustment of the resonance frequency of the power transmitter 110B is done in a state where only the power transmitter 110B is outputting AC power from the primary side resonance coil 13B, and the primary side resonance coils 13A, 13C of the power transmitters 110A, 110C are not outputting AC power. Furthermore, as the switches 401A, 401C are turned off, the loop connecting the oscillator 210 and the other power transmitters 110A, 110C is cut off by the switches 401A, 401C.

The power transmitter 110B outputs AC power from the primary side resonance coil 13B, and the feedback control unit 144 of the transmission side control circuit 14B executes the adjustment of the resonance frequency, and fixes the capacitance of the capacitor 132B to the adjusted value (step S207).

Specifically, in a state where the loop connecting the oscillator 210 and the other power transmitters 110A, 110C is cut off by the switches 401A, 401C, and only the power transmitter 110B is outputting AC power from the primary side resonance coil 13B, the feedback control unit 144 of the transmission side control circuit 14B sets the capacitance of the capacitor 132B. Then, the feedback control unit 144 fixes the capacitance of the capacitor 132B to the adjusted value.

The control unit 200A receives data indicating that that adjustment of the resonance frequency of the nth time has been completed from the power transmitter 110B (step S208).

The control unit 200A turns on the switch 401C and turns off the switches 401A, 401B, in order to adjust the resonance frequency of the power transmitter 110C (step S209).

The control unit 200A instructs the power transmitter 110C to adjust the resonance frequency (step S210). The adjustment of the resonance frequency of the power transmitter 110C is done in a state where only the power transmitter 110C is outputting AC power from the primary side resonance coil 13C, and the primary side resonance coils 13A, 13B of the power transmitters 110A, 110B are not outputting AC power. Furthermore, as the switches 401A, 401B are turned off, the loop connecting the oscillator 210 and the other power transmitters 110A, 110B is cut off by the switches 401A, 401B.

The power transmitter 110C outputs AC power from the primary side resonance coil 13C, and the feedback control unit 144 of the transmission side control circuit 14C executes the adjustment of the resonance frequency, and fixes the capacitance of the capacitor 132C to the adjusted value (step S211).

Specifically, in a state where the loop connecting the oscillator 210 and the other power transmitters 110A, 110B is cut off by the switches 401A, 401B, and only the power transmitter 110C is outputting AC power from the primary side resonance coil 13C, the feedback control unit 144 of the transmission side control circuit 14C sets the capacitance of the capacitor 132C. Then, the feedback control unit 144 fixes the capacitance of the capacitor 132C to the adjusted value.

The control unit 200A receives data indicating that that adjustment of the resonance frequency of the nth time has been completed from the power transmitter 110C (step S212).

The control unit 200A determines whether the adjustment of the resonance frequency of all of the power transmitters 110A through 110C is completed (step S213).

When the control unit 200A determines that the adjustment of all of the resonance frequencies is completed, the control unit 200A ends the series of processes.

On the other hand, when control unit 200A determines that the adjustment of all of the resonance frequencies is not completed, the control unit 200A repeatedly executes the process of step S213.

As described above, in the power transmission device 400 according to the second embodiment, the adjustment of the resonance frequency of the power transmitter 110A is performed in a state where only the power transmitter 110A is outputting AC power from the primary side resonance coil 13A, and the primary side resonance coils 13B, 13C of the power transmitters 110B, 110C are not outputting AC power. That is, the adjustment of the resonance frequency of the power transmitter 110A is performed in a state where only the power transmitter 110A is outputting AC power from the primary side resonance coil 13A.

Furthermore, at this time, the switches 401B, 401C are turned off, and therefore the loop connecting the oscillator 210 and the other power transmitters 110B, 110C is cut off by the switches 401B, 401C.

Similarly, the resonance frequencies of the power transmitters 110B, 110C are respectively adjusted when only the power transmitters 110B, 110C are outputting AC power from the primary side resonance coils 13B, 13C.

Furthermore, when adjusting the resonance frequency of the power transmitter 110B, the switches 401A, 401C are turned off, and therefore the loop connecting the oscillator 210 and the other power transmitters 110A, 110C is cut off by the switches 401A, 401C.

Furthermore, when adjusting the resonance frequency of the power transmitter 110C, the switches 401A, 401B are turned off, and therefore the loop connecting the oscillator 210 and the other power transmitters 110A, 110B is cut off by the switches 401A, 401B.

Therefore, in the power transmission device 400 according to the second embodiment, it is possible to adjust the resonance frequency in a state where the effects of the power transmitters 110A, 110B, 110C on each other are reduced, and therefore it is possible to adjust the resonance frequencies of the power transmitters 110A, 110B, 110C with high precision.

In the power transmission device 400 according to the second embodiment, the switches 401A through 401C cut of the loop connecting the oscillator 210 and the power transmitters 110A through 110C, and therefore the adjustment of the resonance frequency is ended by one time. Therefore, it is possible to end the adjustment of the resonance frequency by a shorter time compared to the power transmission device 300 according to the first embodiment.

Particularly, it is possible to cut off the loop connecting the power transmitter, for which the resonance frequency is not to be adjusted, and the oscillator 210, by a switch, and therefore it is possible to adjust the resonance frequency of each of the power transmitters 110A, 110B, 110C with high precision in a state where the effects from other power transmitters are further reduced.

The above describes a power transmission device according to an embodiment that exemplifies the present invention; however, the present invention is not limited to the specific embodiments described herein, and variations and modifications may be made without departing from the spirit and scope of the present invention.

A power transmission device that is capable of adjusting the resonance frequency of a plurality of power transmitters with high precision is provided.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power transmission device comprising:
a first power transmitter; and
a second power transmitter, wherein
the first power transmitter includes
a first primary side resonance coil configured to receive power from an AC power source,
a first phase difference detection unit configured to detect a first phase difference between a phase of a first current flowing to the first primary side resonance coil and a phase of a first voltage supplied to the first primary side resonance coil,
a first variable capacitance unit provided at the first primary side resonance coil, and
a first control unit configured to adjust a first capacitance of the first variable capacitance unit such that a resonance frequency is attained, based on a variation degree of the first phase difference with respect to a variation of the first capacitance when the first capacitance is varied, and wherein
the second power transmitter includes
a phase adjustment unit connected to the AC power source,
a second primary side resonance coil configured to receive power from the AC power source via the phase adjustment unit, the second primary side resonance coil being arranged beside the first primary side resonance coil,
a second phase difference detection unit configured to detect a second phase difference between a phase of a second current flowing to the second primary side resonance coil and a phase of a second voltage supplied to the second primary side resonance coil,
a second variable capacitance unit provided at the second primary side resonance coil, and
a second control unit configured to adjust a second capacitance of the second variable capacitance unit such that a resonance frequency is attained, based on a variation degree of the second phase difference to a variation of the second capacitance when the second capacitance is varied, and wherein
the first control unit adjusts the resonance frequency of the first power transmitter in a state where the second power transmitter is off, and the second control unit adjusts the resonance frequency of the second power transmitter in a state where the first power transmitter is off.

2. The power transmission device according to claim 1, wherein
the first control unit and the second control unit respectively control on/off of the first power transmitter and the second power transmitter,
the first control unit causes the second control unit to turn off the second power transmitter when the first control unit adjusts the resonance frequency of the first power transmitter, and
the second control unit causes the first control unit to turn off the first power transmitter when the second control unit adjusts the resonance frequency of the second power transmitter.

3. The power transmission device according to claim 2, wherein
the first control unit adjusts the resonance frequency of the first power transmitter in a state where the first control unit has caused the second control unit to turn off output from the second power transmitter, and
the second control unit adjusts the resonance frequency of the second power transmitter in a state where the second control unit has caused the first control unit to turn off output from the first power transmitter.

4. The power transmission device according to claim 1, wherein
the first control unit adjusts the resonance frequency of the first power transmitter in a state where the first control unit has caused the second control unit to turn off output from the second power transmitter, until a first difference between a first capacitance set by a present adjustment process and a first capacitance set by a previous adjustment process becomes less than or equal to a predetermined value as an absolute value,
the second control unit adjusts the resonance frequency of the second power transmitter in a state where the second control unit has caused the first control unit to turn off output from the first power transmitter, until a second difference between a second capacitance set by a present adjustment process and a second capacitance set by a previous adjustment process becomes less than or equal to a predetermined value as an absolute value, and
the first control unit and the second control unit respectively end a process of adjusting the resonance frequency of the first power transmitter and the second power transmitter, when the first difference and the second difference both become less than or equal to the predetermined value as an absolute value.

5. The power transmission device according to claim 2, further comprising:
a first switch inserted between the AC power source and the first primary side resonance coil, wherein a connection state of the first switch is switched by the first control unit; and
a second switch inserted between the AC power source and the second primary side resonance coil, wherein a connection state of the second switch is switched by the second control unit, wherein
the first control unit adjusts the resonance frequency of the first power transmitter in a state where the second power transmitter is turned off by causing the second control unit to switch the second switch into a non-conductive state, and
the second control unit adjusts the resonance frequency of the second power transmitter in a state where the first power transmitter is turned off by causing the first control unit to switch the first switch into a non-conductive state.

6. The power transmission device according to claim 1, wherein
the power transmission device transmits power by fixing the first capacitance of the first variable capacitance unit and the second capacitance of the second variable capacitance unit, after the adjustment of the resonance frequency of the first power transmitter and the adjustment of the resonance frequency of the second power transmitter have been completed.

7. The power transmission device according to claim 1, wherein
the first power transmitter further includes
a first primary side coil configured to receive power from the AC power source, the first primary side coil being provided between the AC power source and the first primary side resonance coil, wherein
the first primary side resonance coil receives power from the first primary side coil by electromagnetic induction, and wherein
the second power transmitter further includes
a second primary side coil connected to the AC power source via the phase adjustment unit, wherein
the second primary side resonance coil receives power from the second primary side coil by electromagnetic induction.

* * * * *